(12) United States Patent
Line et al.

(10) Patent No.: US 11,148,571 B2
(45) Date of Patent: Oct. 19, 2021

(54) VEHICLE SEATING ASSEMBLY HAVING A LOWER LEG SUPPORT

(71) Applicant: Ford Global Technologies, LLC, Dearborn, MI (US)

(72) Inventors: Johnathan Andrew Line, Northville, MI (US); Carol Diane Casey, Dearborn, MI (US); Spencer Robert Hoernke, Dundas (CA); Jimmy Moua, Canton, MI (US); Brian Boland, Pinckney, MI (US); Sean Bayle West, Monroe, MI (US); Kevin Wayne Preuss, Berkley, MI (US); Keith Allen Godin, Dearborn, MI (US)

(73) Assignee: Ford Global Technology, LLC, Dearborn, MI (US)

( * ) Notice: Subject to any disclaimer, the term of this patent is extended or adjusted under 35 U.S.C. 154(b) by 51 days.

(21) Appl. No.: 16/693,659

(22) Filed: Nov. 25, 2019

(65) Prior Publication Data

US 2021/0155137 A1    May 27, 2021

(51) Int. Cl.
*B60N 2/90* (2018.01)
*B60N 2/02* (2006.01)
*B60N 2/20* (2006.01)

(52) U.S. Cl.
CPC ........... *B60N 2/995* (2018.02); *B60N 2/0232* (2013.01); *B60N 2/20* (2013.01); *B60N 2/914* (2018.02); *B60N 2/933* (2018.02); *B60N 2002/0236* (2013.01); *B60N 2002/924* (2018.02)

(58) Field of Classification Search
CPC ........ B60N 2/995; B60N 2/914; B60N 2/933; B60N 2/0232; B60N 2/20; B60N 2002/924; B60N 2002/0236
USPC ....... 297/68, 69, 71, 423.19, 423.24, 423.26
See application file for complete search history.

(56) References Cited

U.S. PATENT DOCUMENTS

| | | | | |
|---|---|---|---|---|
| 4,678,229 A * | 7/1987 | Ryan | .................... | A47C 1/0248 248/408 |
| 5,651,587 A * | 7/1997 | Kodaverdian | ....... | B60N 2/0228 297/423.36 |
| 6,237,994 B1 * | 5/2001 | Bentley | .................. | A47C 1/023 297/118 |

(Continued)

FOREIGN PATENT DOCUMENTS

| DE | 3617709 A1 | 12/1987 |
|---|---|---|
| DE | 3729836 A1 | 3/1989 |

*Primary Examiner* — Mark R Wendell
(74) *Attorney, Agent, or Firm* — David Coppiellie; Price Heneveld LLP

(57) ABSTRACT

A vehicle seating assembly includes a seat, a seatback, and a lower leg support. The seat includes a forward end and a rearward end. The seatback is pivotably coupled to the seat. The lower leg support includes an interior surface and an exterior surface. The lower leg support is rotatably coupled to the forward end of the seat and is movable between a stowed position and a deployed position. The stowed position of the lower leg support places the lower leg support in an area below the seat. The stowed position of the lower leg support forms an acute angle with the seat. A linkage assembly is coupled to an underside of the seat and the interior of the lower leg support. The linkage assembly is responsible for transitioning the lower leg support between the stowed position and the deployed position.

20 Claims, 15 Drawing Sheets

(56) References Cited

U.S. PATENT DOCUMENTS

| | | | |
|---|---|---|---|
| 6,926,366 B2* | 8/2005 | Wolters | A61G 13/12 |
| | | | 297/423.36 |
| 8,567,868 B2 | 10/2013 | Kuno | |
| 8,870,289 B2* | 10/2014 | Yin | A47C 7/5068 |
| | | | 297/423.22 |
| 10,232,756 B2 | 3/2019 | Kim et al. | |
| 10,843,612 B1* | 11/2020 | Casey | B60N 2/995 |
| 2001/0033101 A1* | 10/2001 | Plant | B64D 11/0643 |
| | | | 297/342 |
| 2010/0244534 A1 | 9/2010 | Driessen et al. | |
| 2012/0091779 A1* | 4/2012 | Chang | B60N 2/995 |
| | | | 297/423.3 |
| 2013/0045824 A1* | 2/2013 | Yin | B60N 2/0232 |
| | | | 474/148 |
| 2013/0045825 A1* | 2/2013 | Yin | A47C 7/5068 |
| | | | 474/150 |
| 2015/0021969 A1* | 1/2015 | Yin | B60N 2/62 |
| | | | 297/423.26 |
| 2016/0339820 A1* | 11/2016 | Kajino | B60N 2/995 |
| 2017/0341543 A1 | 11/2017 | Fujisawa et al. | |
| 2018/0304791 A1 | 10/2018 | Hur et al. | |
| 2019/0106038 A1 | 4/2019 | Rose et al. | |

* cited by examiner

VEHICLE SEATING ASSEMBLY HAVING A LOWER LEG SUPPORT

FIELD OF THE DISCLOSURE

The present disclosure generally relates to a vehicle seating assembly. More specifically, the present disclosure relates to a vehicle seating assembly having a lower leg support.

BACKGROUND OF THE INVENTION

Vehicles are typically provided with a variety of measures that seek to improve the comfort and convenience of occupants. However, additional solutions are needed that seek to address some of the expanding desires of consumers for comfort and convenience.

SUMMARY OF THE INVENTION

According to a first aspect of the present disclosure, a vehicle seating assembly includes a seat, a seatback, and a lower leg support. The seat includes a forward end and a rearward end. The seatback is pivotably coupled to the seat. The lower leg support includes an interior surface and an exterior surface. The lower leg support is rotatably coupled to the forward end of the seat and is movable between a stowed position and a deployed position. The stowed position of the lower leg support places the lower leg support in an area below the seat. The stowed position of the lower leg support forms an acute angle with the seat. The linkage assembly is coupled to an underside of the seat and the interior of the lower leg support. The linkage assembly is responsible for transitioning the lower leg support between a stowed position and a deployed position.

Embodiments of the first aspect of the present disclosure can include any one or a combination of the following features:

- the linkage assembly includes one or more guide tracks that directly couple to the interior surface of the lower leg support, a motor directly coupled to, and carried by, the interior surface of the lower leg support, a lead screw that is coupled to the lower leg support and is parallel to the one or more guide tracks, the lead screw having a first end and a second end, the first end of the lead screw being directly coupled to the motor, such that the motor imparts rotational motion to the lead screw, and a drive nut engaged with the lead screw such that rotation of the lead screw affects movement of the drive nut along the length of the lead screw, wherein adjustment of the drive nut along the length of the screw adjusts a rotational position of the lower leg support;
- the one or more guide tracks include a first guide track and a second guide track that are spaced apart from one another along a horizontal direction of the interior surface of the lower leg support, with the first and second guide tracks being parallel to one another;
- a synchronizing bracket that is coupled to the drive nut such that actuation of the drive nut along the lead screw affects corresponding actuation of the synchronizing bracket along the lead screw;
- the linkage assembly including a first linkage arm that is coupled to a first end of the synchronizing bracket and associated with the first guide track, and a second linkage arm coupled to a second end of the synchronizing bracket and associated with the second guide track;
- the first and second linkage arms are coupled to a carrier bracket that is mounted to the underside of the seat;
- the carrier bracket pivots about a horizontal axis as the lower leg support is transitioned between the stowed position and the deployed position;
- the first and second linkage arms are extendable from a compressed position to an extended position, and the first and second linkage arms are biased to the extended position;
- the lower leg support includes a proximate end and a distal end, the proximate end of the lower leg support being rotatably coupled to the forward end of the seat, and the motor being positioned at the proximate end of the lower leg support;
- the stowed position of the lower leg support positions the drive nut nearest to the distal end of the lower leg support;
- actuation of the drive nut from the distal end of the lower leg support toward the proximate end of the lower leg support transitions the lower leg support from the stowed position toward the deployed position; and
- an air bladder assembly having a calf portion and thigh portion, the calf portion being positioned on the exterior surface of the lower leg support and the thigh portion being positioned on the seat proximate to the forward end, the calf portion and the thigh portion being coupled to a common air supply.

According to a second aspect of the present disclosure, a vehicle seating assembly includes a seat, a seatback, a lower leg support, and a linkage assembly. The seat has a forward end and a rearward end. The seatback is pivotably coupled to the seat. The lower leg support has an interior surface and an exterior surface and the lower leg support is rotatably coupled to the forward end of the seat. The lower leg support is movable between a stowed position and a deployed position, with the stowed position placing the lower leg support in an area below the seat. The stowed position of the lower leg support forms an acute angle with the seat. The linkage assembly is coupled to an underside of the seat and to the interior surface of the lower leg support. The linkage assembly is responsible for transitioning the lower leg support between the stowed position and the deployed position. The linkage assembly includes a first guide track and a second guide track that are spaced apart from one another along the horizontal axis of the interior surface of the lower leg support. The first and second guide tracks are parallel to one another with the first and second guide tracks each being directly coupled to the interior surface of the lower leg support. The linkage assembly also includes a motor that is directly coupled to, and carried by, the interior surface of the lower leg support. The linkage assembly further includes a lead screw that is coupled to the lower leg support and is parallel to the one or more guide tracks, with the lead screw having a first end and a second end. The lead screws first end is directly coupled to the motor, such that the motor imparts rotational motion to the lead screw. Additionally, the linkage assembly includes a drive nut that is engaged with the lead screw such that rotation of the lead screw affects movement of the drive nut along the length of the lead screw, with adjustment of the drive nut along the length of the lead screw adjusting a rotational position of the lower leg support. Further, the linkage assembly includes a synchronizing bracket that is coupled to the drive nut such that actuation of the drive nut along the lead screw affects corresponding actuation of the synchronizing bracket along the lead screw. Still further, the linkage assembly includes a first linkage arm coupled to a first end of the synchronizing bracket and associated with the first guide track. Further, the linkage assembly includes a second linkage arm coupled to a second end of the synchronizing bracket and associated with the second guide track.

Embodiments of the second aspect of the present disclosure can include any one or a combination of the following features:

- the first and second linkage arms are coupled to a carrier bracket that is mounted to the underside of the seat;
- the carrier bracket pivots about a horizontal axis as the lower leg support is transitioned between the stowed position and the deployed position;
- the first and second linkage arms are extendable from a compressed position to an extended position, wherein the first and second linkage arms are biased to the extended position;
- the lower leg support includes a proximate end and a distal end, the proximate end of the lower leg support being rotatably coupled to the forward end of the seat, and wherein the motor is positioned at the proximate end of the lower leg support;
- the stowed position of the lower leg support positions the drive nut nearest to the distal end of the lower leg support;
- actuation of the drive nut from the distal end of the lower leg support toward the proximate end of the lower leg support transitions the lower leg support from the stowed position toward the deployed position; and
- an air bladder assembly having a calf portion and a thigh portion, the calf portion being positioned on the exterior surface of the lower leg support and the thigh portion being positioned on the seat proximate to the forward end, the calf portion and the thigh portion being coupled to a common air supply.

DETAILED DESCRIPTION OF THE PREFERRED EMBODIMENTS

Figure 1:
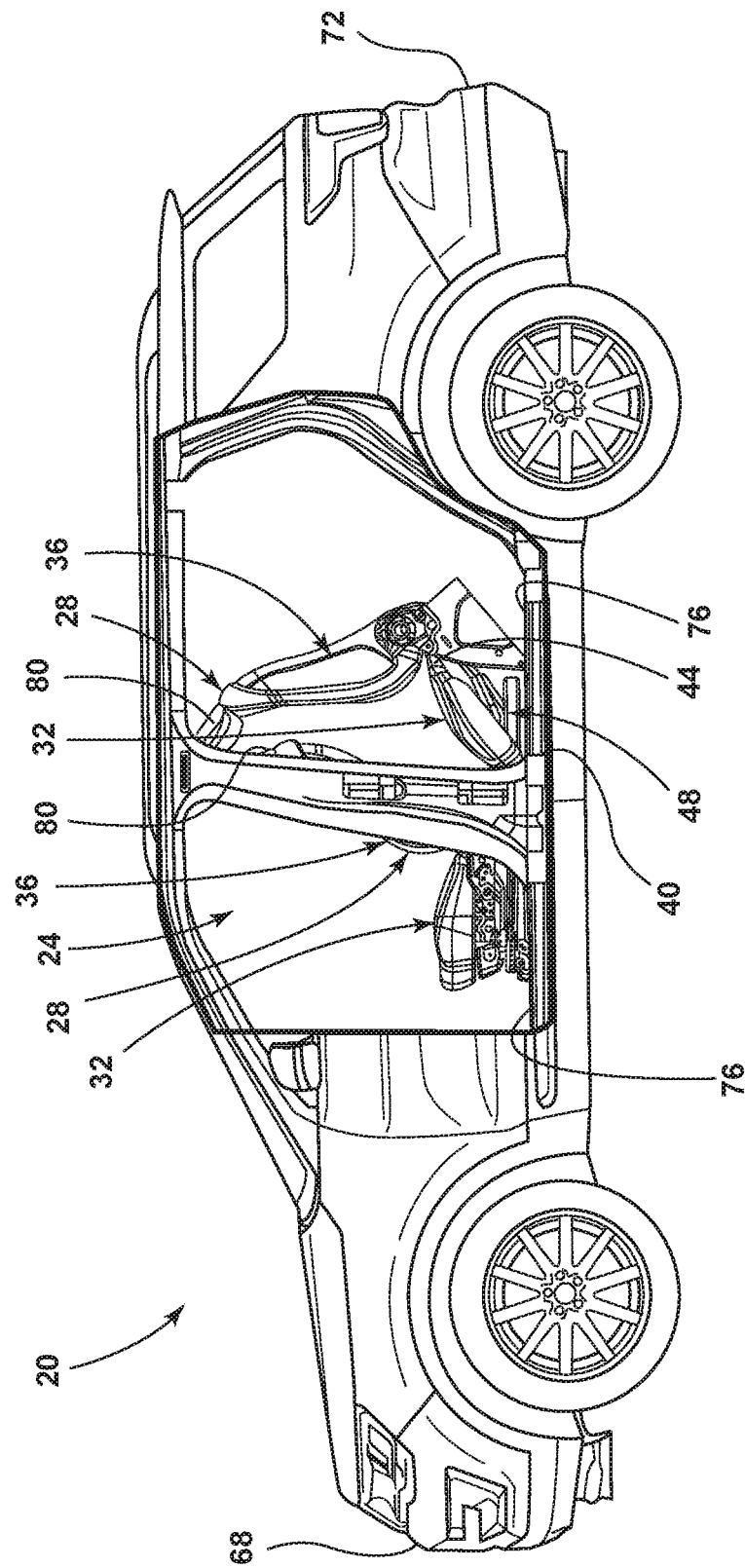
FIG. 1 is a side view of a vehicle, illustrating a vehicle seating assembly in a forward-pitched position, according to one example.
Figure 2:
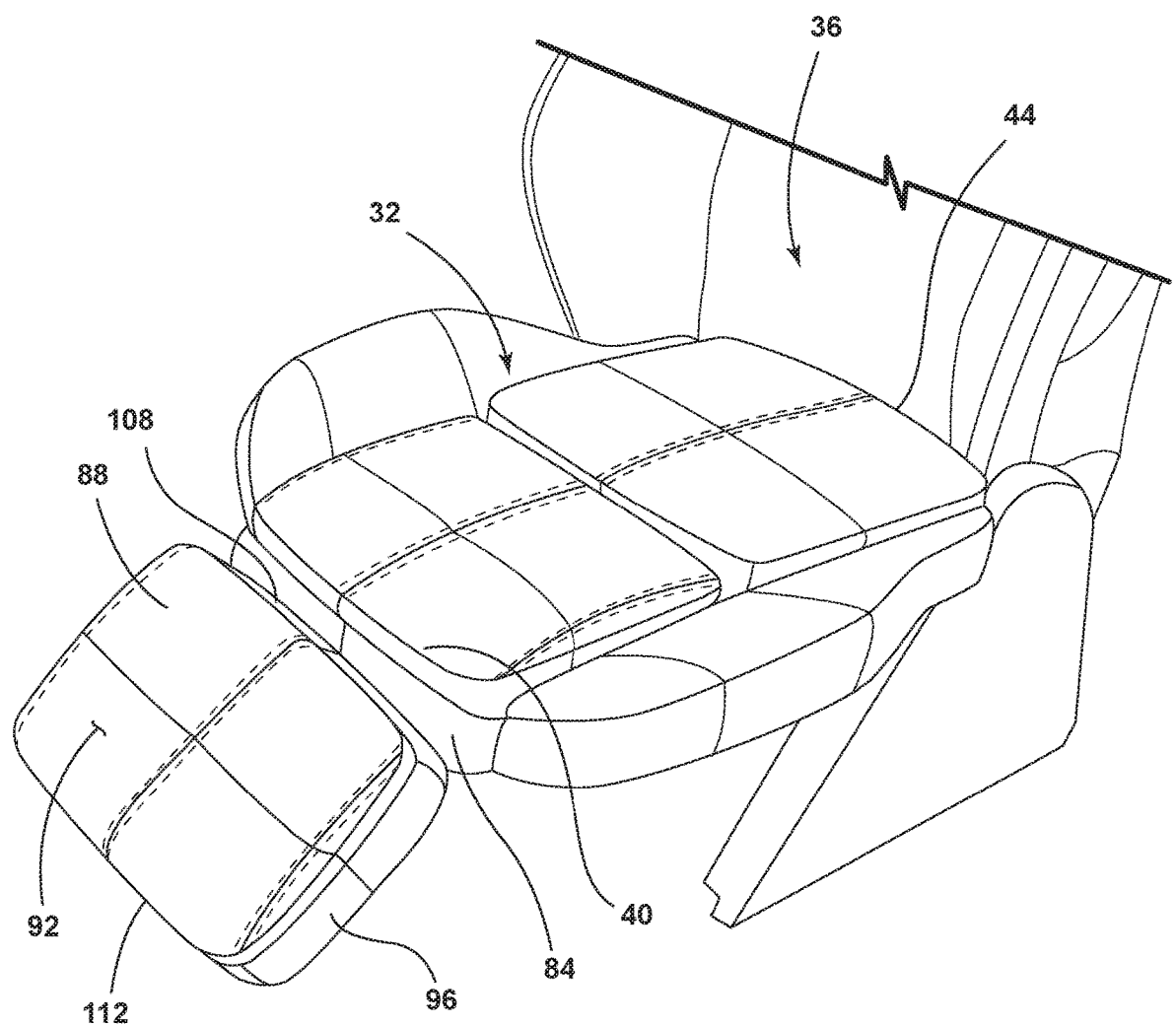
FIG. 2 is a side perspective view of the vehicle seating assembly illustrating a lower leg support coupled to a seat of the vehicle seating assembly, according to one example.

For purposes of description herein, the terms "upper," "lower," "right," "left," "rear," "front," "vertical," "horizontal," and derivatives thereof shall relate to the concepts as oriented in FIG. 1 or 2. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle seating assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 6:
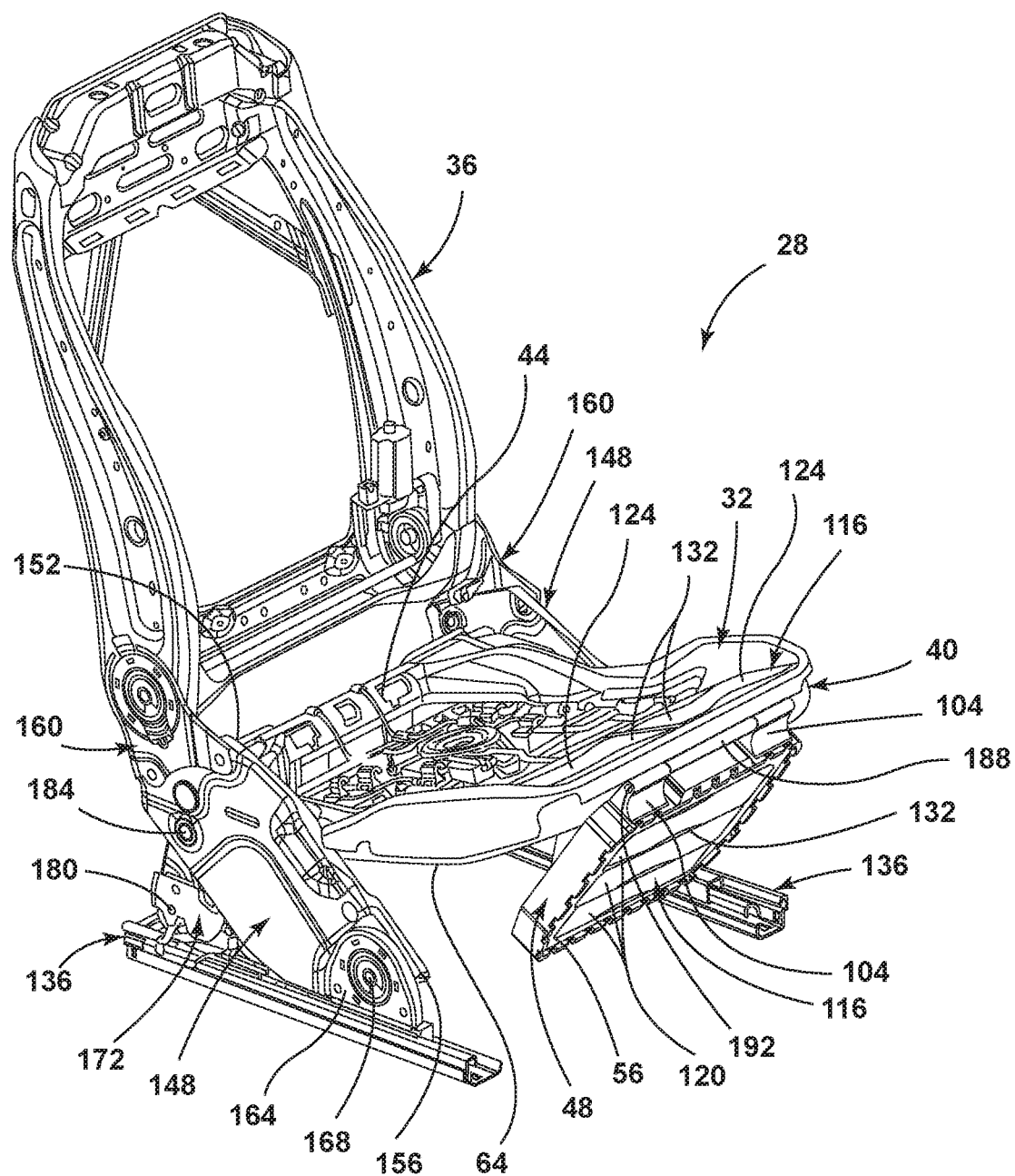
FIG. 6 is a side perspective view illustrating the vehicle seating assembly with the lower leg support in the stowed position, according to one example.
Figure 7:
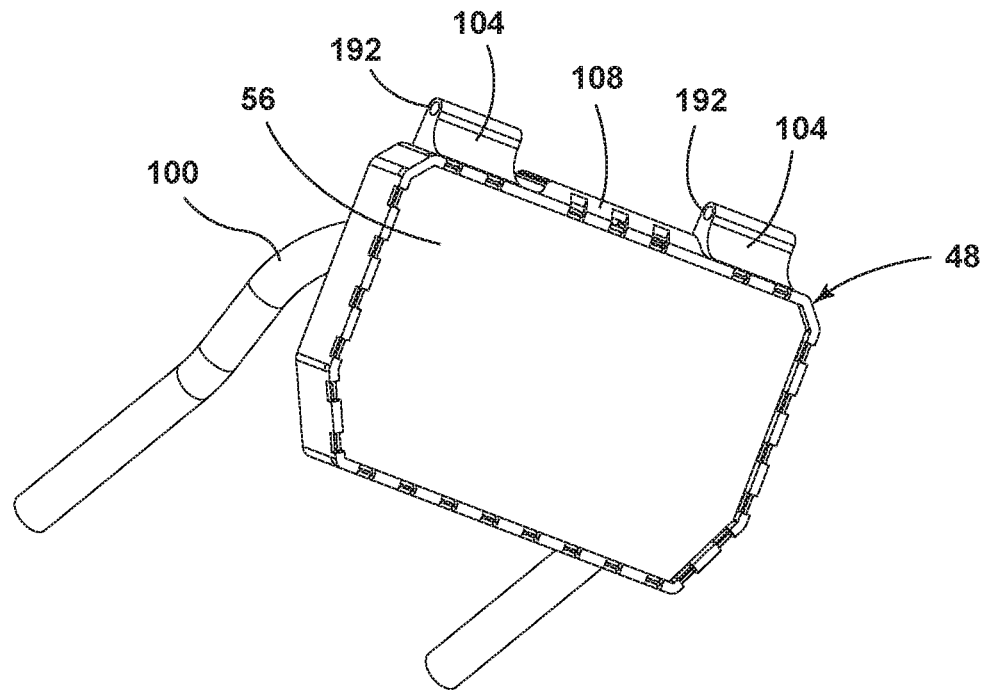
FIG. 7 is a front perspective view of the lower leg support viewed from underneath a forward portion of the vehicle seating assembly, according to one example.
Figure 8:
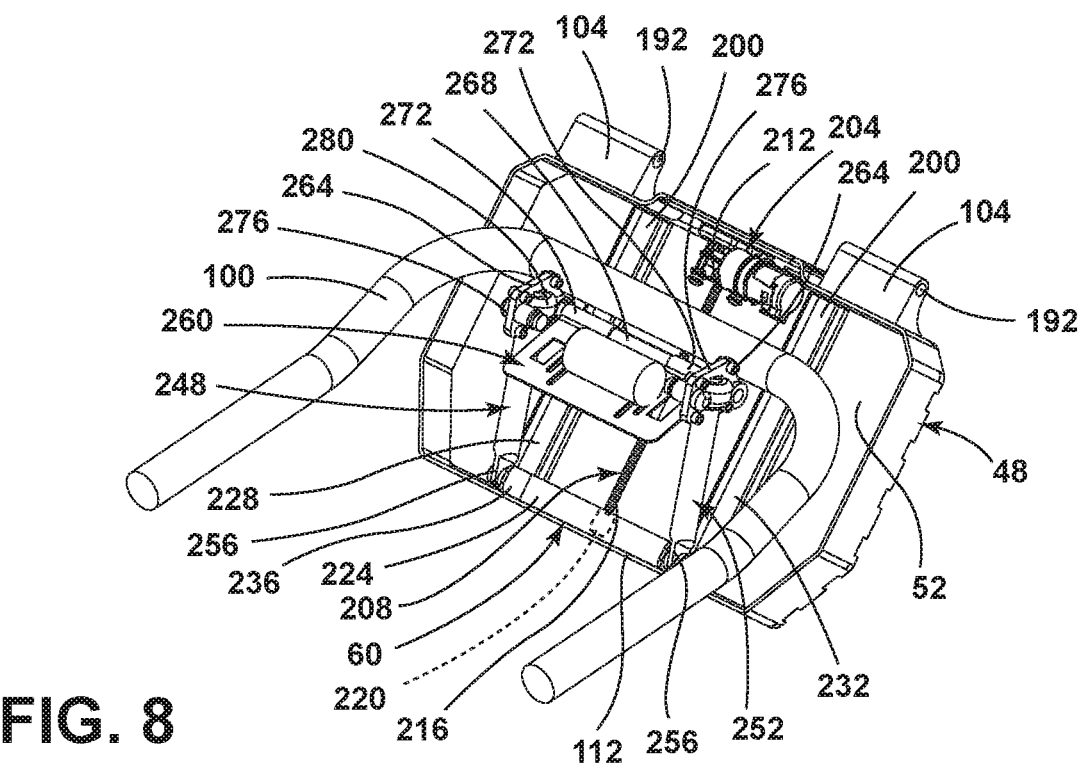
FIG. 8 is a rear perspective view of the lower leg support, illustrating a coupling between the lower leg support and a component of the seat, according to one example.
Figure 9:
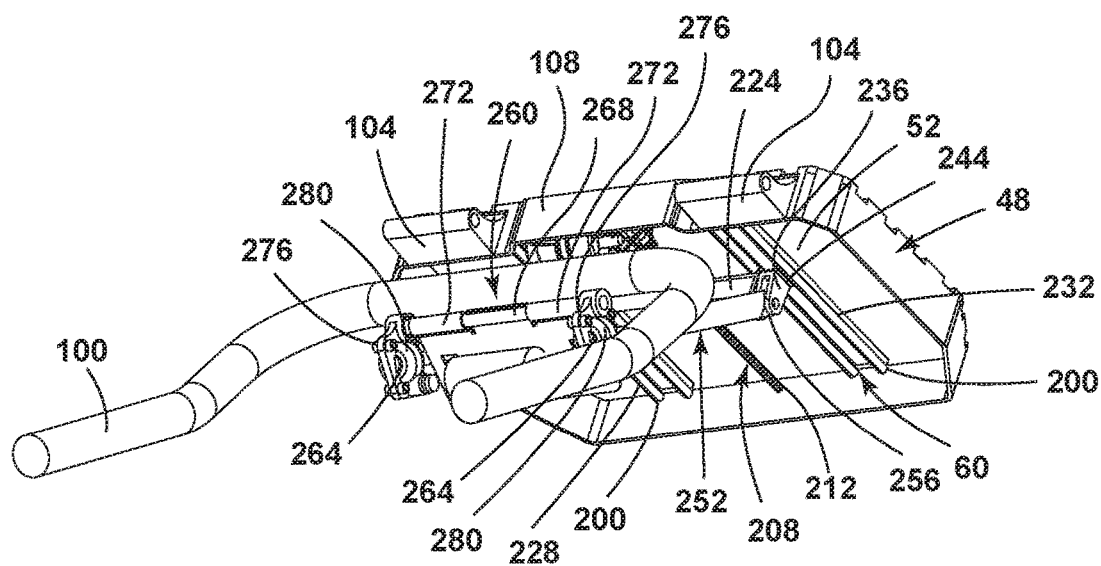
FIG. 9 is a rear perspective view, illustrating the lower leg support in a deployed position and depicting a linkage assembly that couples the lower leg support to the seat, according to one example.
Figure 10:
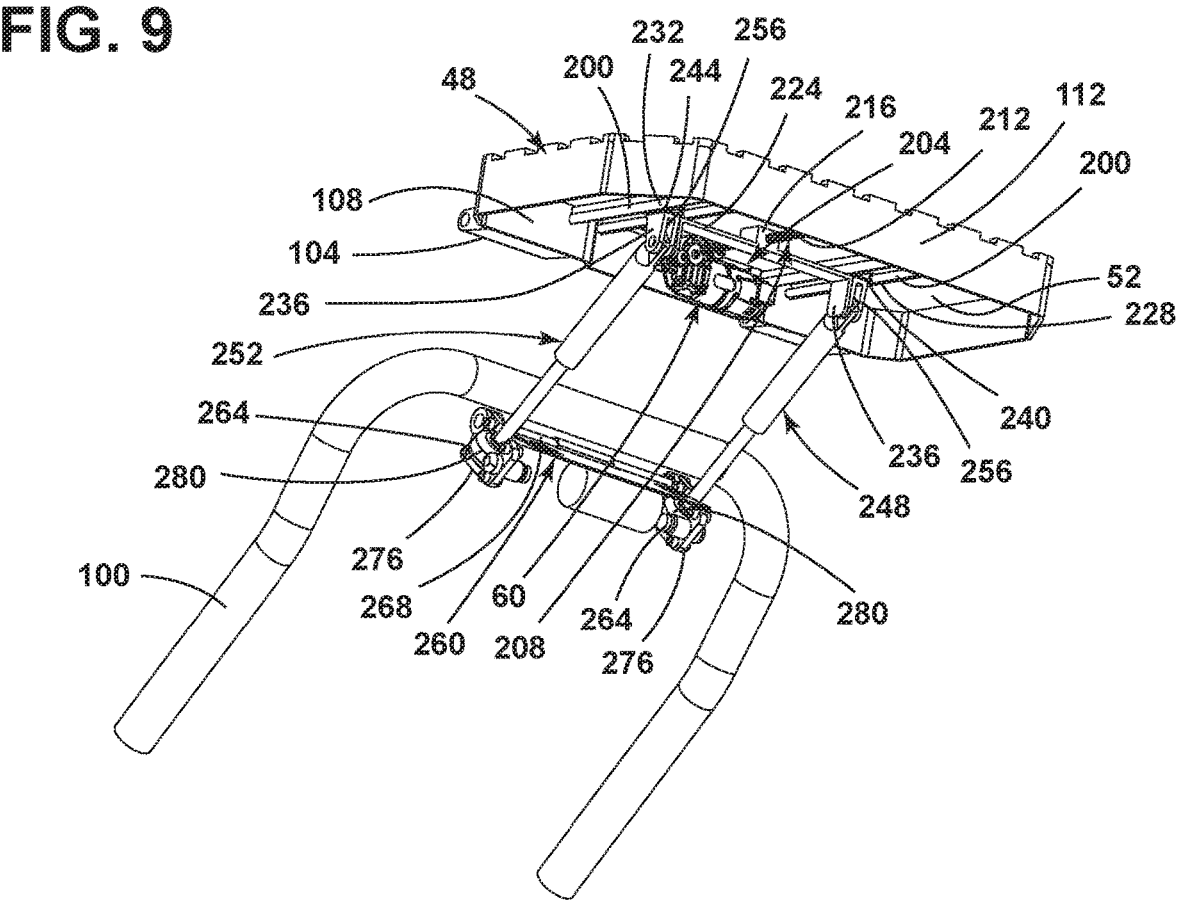
FIG. 10 is a front perspective view from an underside of the seat, illustrating a coupling between the lower leg support and the seat, with the lower leg support in the deployed position, according to one example.
Figure 11:
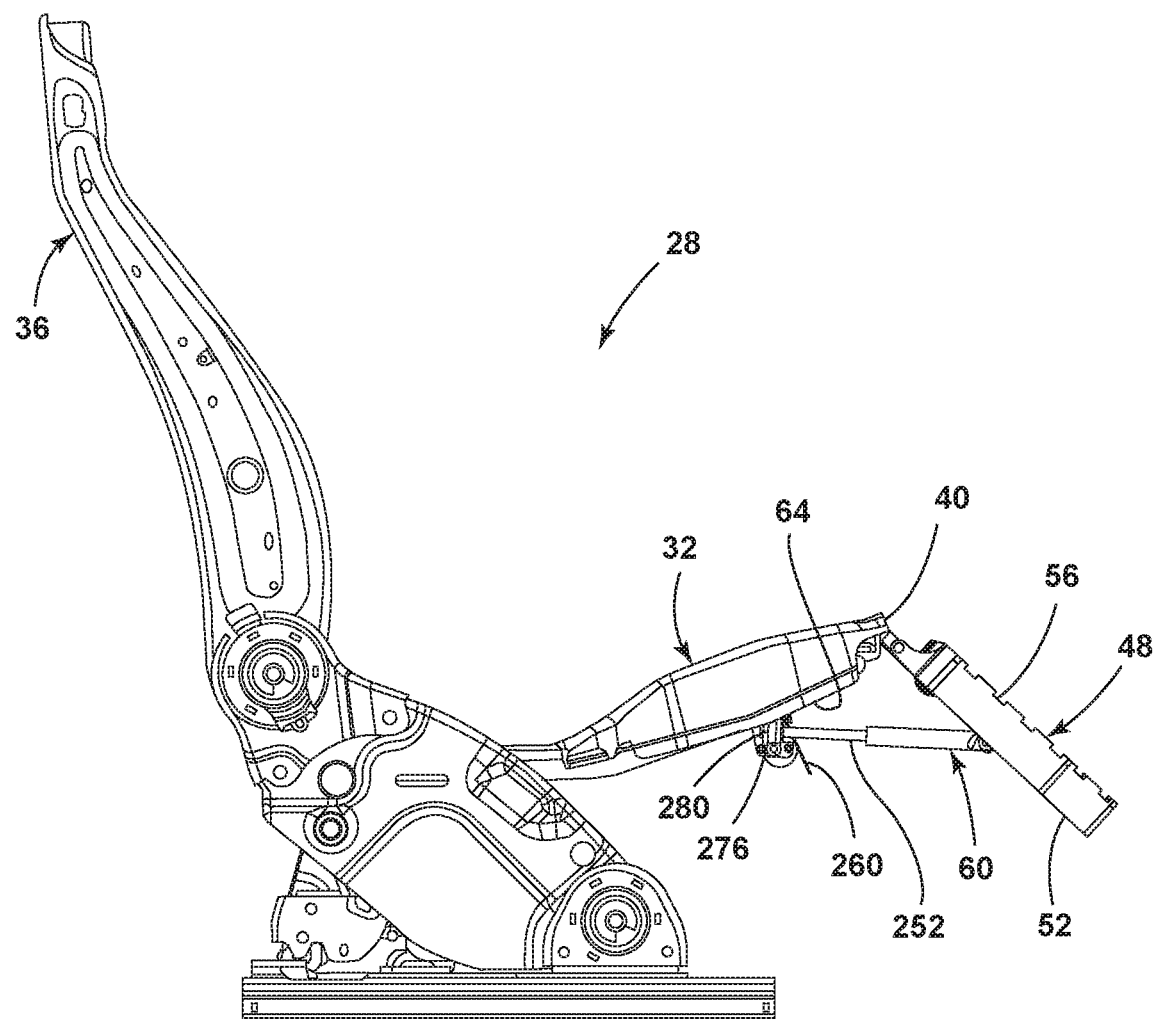
FIG. 11 is a side view of the vehicle seating assembly, illustrating the lower leg support in the deployed position, according to one example.
Figure 12:
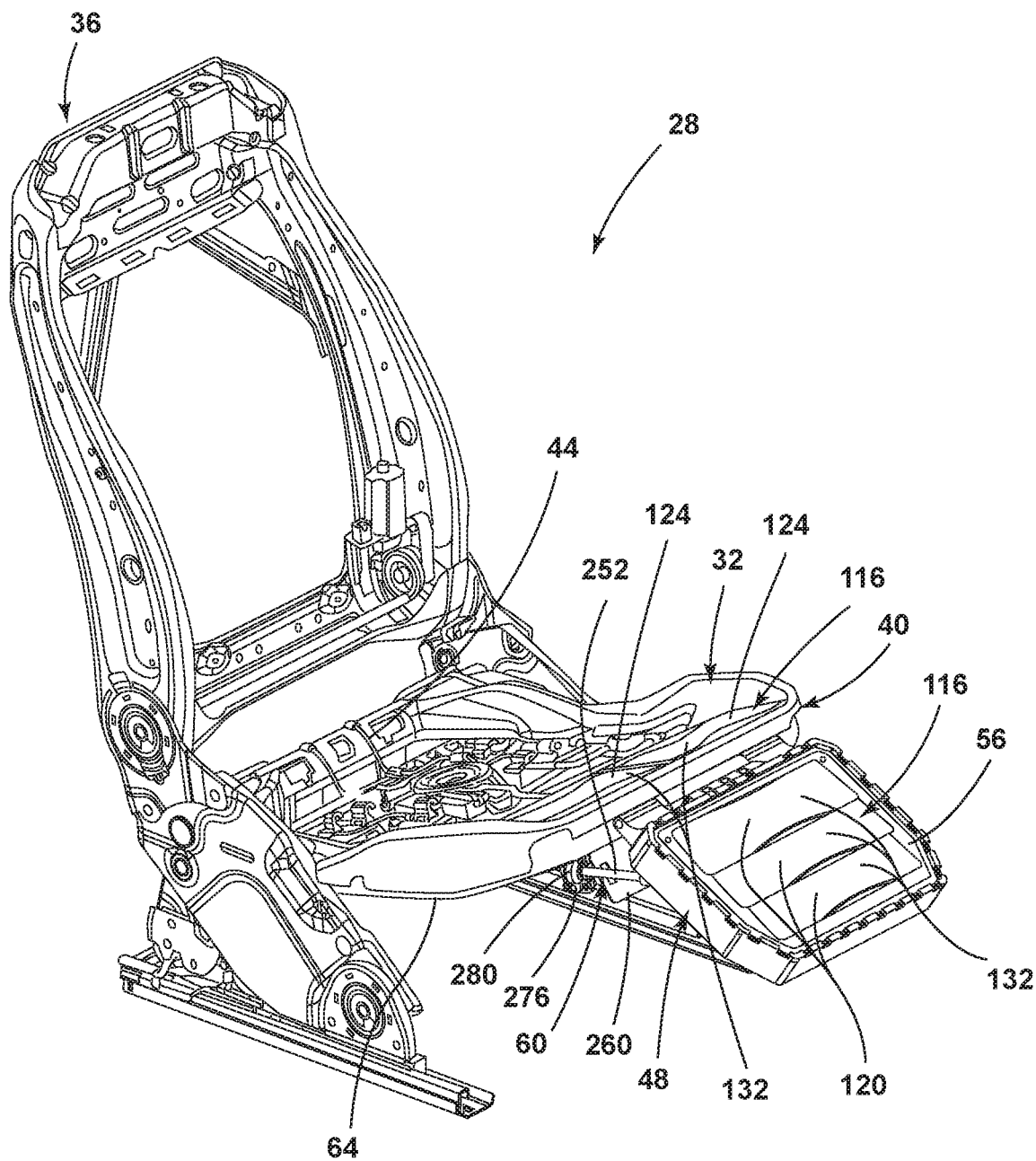
FIG. 12 is a side perspective view of the vehicle seating assembly, illustrating the lower leg support in the deployed position, according to one example.

Referring to FIGS. 1-19, reference numeral 20 generally designates a vehicle. The vehicle 20 can be a motor vehicle, such as a land vehicle, a watercraft, or an air-travel vehicle. The vehicle 20 includes a cabin 24. The cabin 24 includes one or more vehicle seating assemblies 28 provided therein. Some of the vehicle seating assemblies 28 may be provided with the capability of being actuatable from a use position first row seating assembly in FIG. 1) to a forward-pitched position (e.g., second row seating assembly in FIG. 1). The forward-pitched position can be utilized to facilitate additional space for ingress and egress of occupants seated rearward of the second row seating assembly or cargo positioned rearward of the second row seating assembly. The vehicle seating assembly 28 includes a seat 32 and a seatback 36. The seatback 36 is pivotably coupled to the seat 32. The seat 32 has a forward end 40 and a rearward end 44. The vehicle seating assembly 28 can include a lower leg support 48. The lower leg support 48 has an interior surface 52 and an exterior surface 56, The lower leg support 48 is rotatably coupled to the forward end 40 of the seat 32. The lower leg support 48 is movable between a stowed position (FIG. 4) and a deployed position (FIG. 6). The stowed position places the lower leg support 48 in an area below the seat 32. The stowed position of the lower leg support 48 forms an acute angle with the seat 32. The vehicle seating assembly 28 can further include a linkage assembly 60 that is coupled to an underside 64 of the seat 32 and the interior surface 52 of the lower leg support 48. The linkage assembly 60 is responsible for transitioning the lower leg support 48 between the stowed position and the deployed position.

Referring again to FIG. 1, the vehicle 20 can be provided with one or more of the vehicle seating assemblies 28 arranged in first, second, and/or third rows of seats. As understood in the art, the first row of seats may be nearest to a front 68 of the vehicle 20 while the second and/or third rows of seats are positioned rearward of the front row of seats such that the second and/or third rows of seats are nearer to a rear 72 of the vehicle 20 than the first row of seats. For example, the first row of seats can be positioned nearest to the front 68 of the vehicle 20 and the third row of seats may be positioned nearest to the rear 72 of the vehicle 20 with the second row of seats being positioned between the first and third rows of seats. In the depicted example, the vehicle 20 is provided with two openings on the side of the vehicle 20 for granting a user access to the cabin 24. These access points to the cabin 24 of the vehicle 20 are accessible by way of side passenger doors, as generally understood in the art. One of the rows of seats generally corresponds with each of the access points or apertures in the side of the vehicle 20. However, when the vehicle 20 is provided with a greater number of rows of seats than access points for those rows of seats, such as a three row vehicle being provided with two side doors, then ingress and egress of occupants and/or cargo into the third row of seats can be difficult due to the presence of the second row of seats as a general physical impedance to accessing the third row of seats from the side passenger doors. Accordingly, the vehicle seating assembly 28 in the second row of seats can be provided with the ability to be placed in the forward-pitched position, as depicted in FIG. 1. Therefore, occupants can be provided with a decrease in the physical impedance to accessing the third row of seats from the side passenger door.

Referring further to FIG. 1, the vehicle seating assembly 28 is provided with the lower leg support 48 coupled to the forward end 40 of the seat 32. This additional feature of the lower leg support 48 can make placing the vehicle seating assembly 28 in the forward-pitched position more difficult due to physical constraints of the lower leg support 48 contacting a floor 76 of the vehicle 20 or the lower leg support 48 contacting the vehicle seating assembly positioned immediately in front of the forward-pitched vehicle seating assembly 28. With these constraints in mind, the vehicle seating assembly 28 and the lower leg support 48 of the present disclosure have been designed and arranged as a compact package capable of being stowed in an area directly below the seat 32 such that the lower leg support 48 forms an acute angle with the seat 32 and/or forms an acute angle with a horizontal plane (e.g., a plane parallel to the floor 76 of the vehicle 20) when the lower leg support 48 is placed in the stowed position. The acute angle between the seat 32 and the lower leg support 48 when the lower leg support 48 is in the stowed position prevents the lower leg support 48 from contacting the floor 76 of the vehicle 20 or the seating assembly positioned directly in front of the vehicle seating assembly 28 that is being actuated to the forward-pitched position, thereby enabling a greater degree of rotational displacement from the use position of the vehicle seating assembly 28 to the forward-pitched position of the vehicle seating assembly 28. The greater degree of rotational freedom for the vehicle seating assembly 28, by stowing the lower leg support 48 in the manner disclosed herein, increases the space available for an occupant to either ingress or egress from the third row of seats rearward of the forward-pitched vehicle seating assembly 28. In the depicted example, the seatback 36 can remain in an upright or erect position when in the forward-pitched position. Maintaining the seatback 36 in the upright or erect position when in the forward-pitched position may provide additional rotational freedom of the vehicle seating assembly 28 than if the seatback 36 were placed in a forward-dumped position, whereby the forward-dumped position places the seatback 36 and the seat 32 in physical contact with one another and generally parallel to one another. The additional rotational freedom that may be provided by maintaining the seatback 36 in the more upright position relative to the seat 32 can be facilitated by enabling a greater degree of actuation rotationally forward prior to the seatback 36 of the second row of seats contacting the seatback 36 of the first row of seats. Additionally, it is possible to position a headrest 80 of the vehicle seating assembly 28 that is in the forward-pitched position as disposed vertically above the headrest 80 of the vehicle seating assembly 28 that is positioned in the first row of seats.

Figure 3:
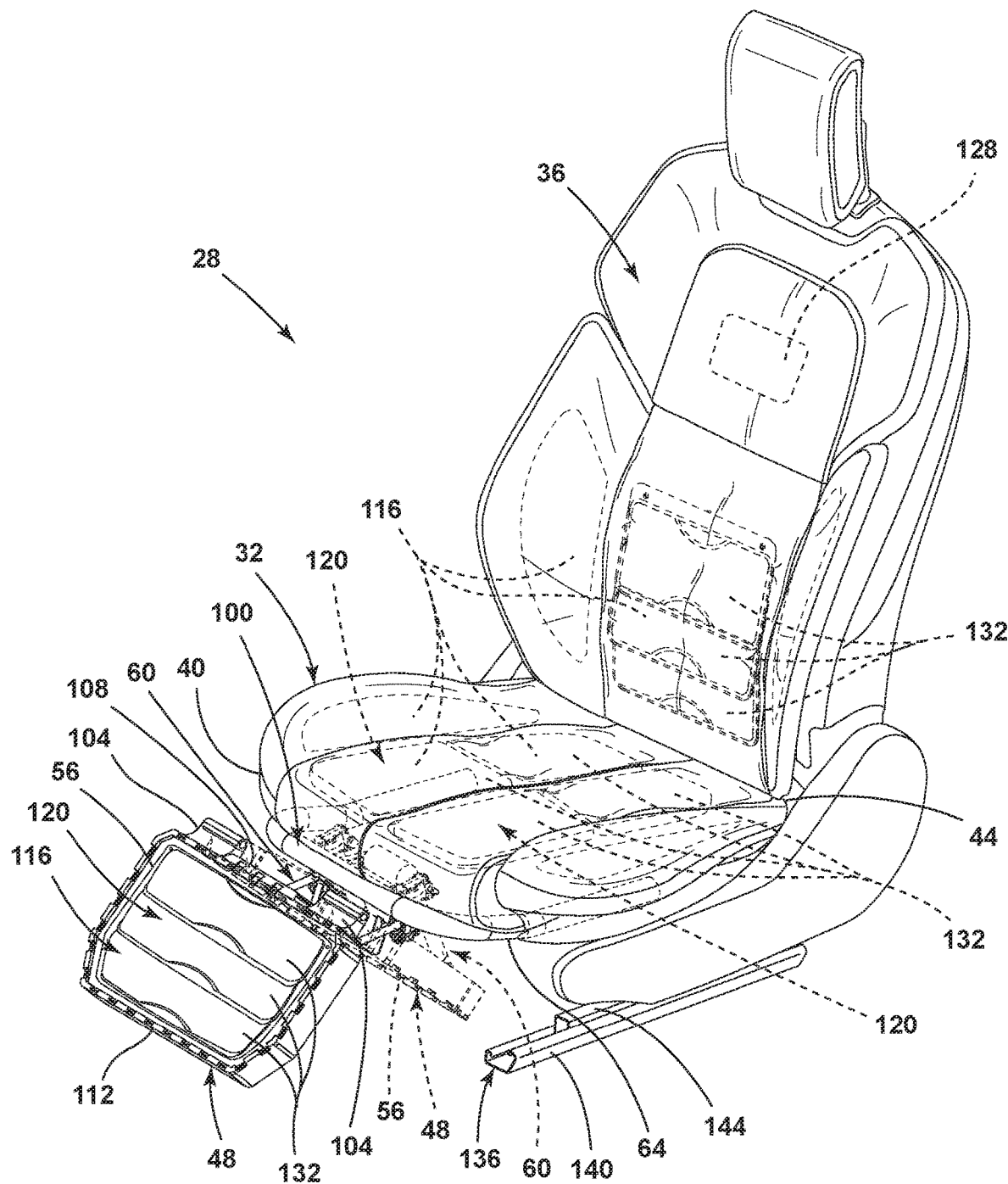
FIG. 3 is a side perspective view of the vehicle seating assembly, illustrating the lower leg support in a deployed position and a stowed position (shown in phantom), as well as inflatable members that are provided on the vehicle seating assembly in a deflated state, according to one example.
Figure 4:
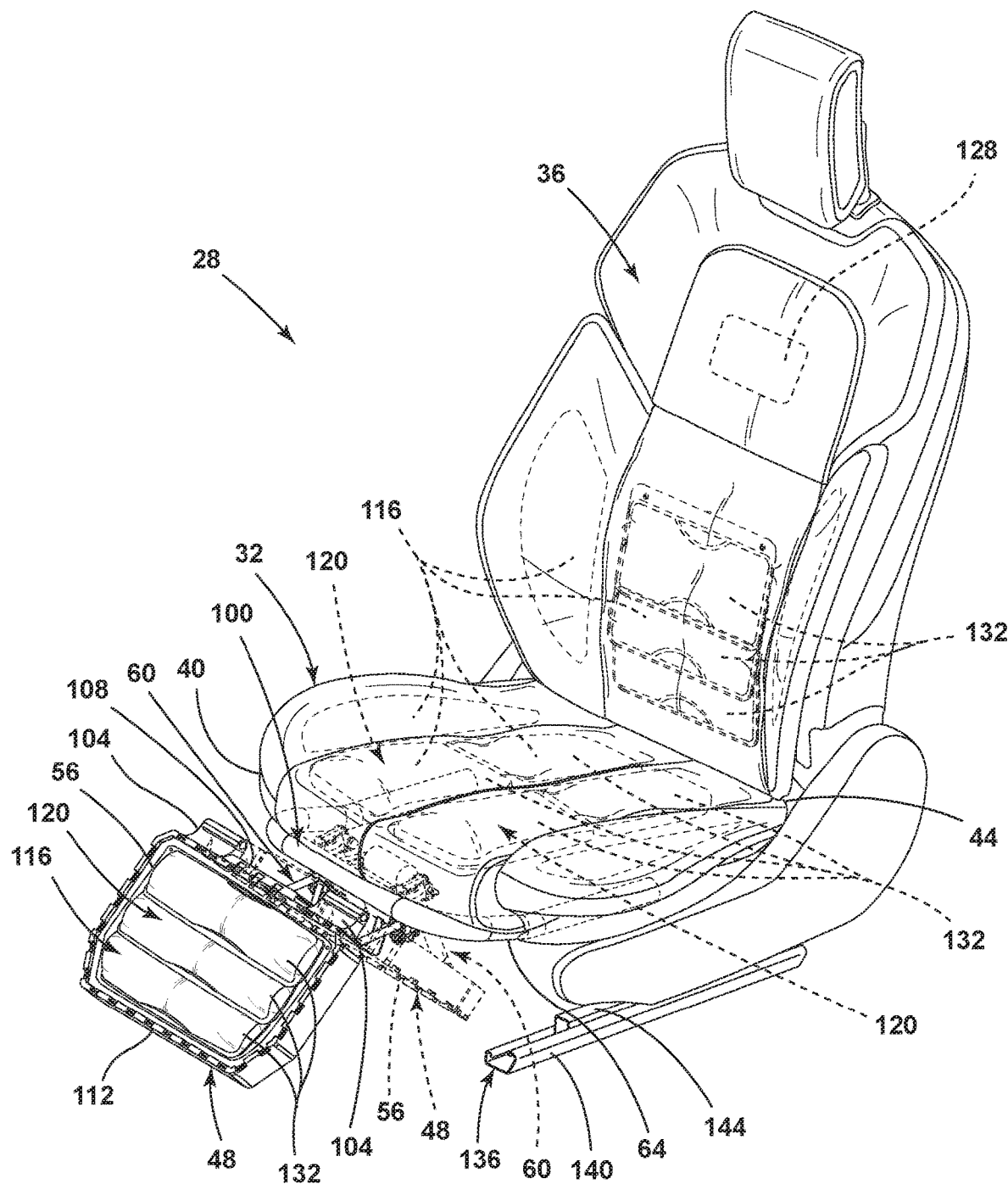
FIG. 4 is a side perspective view of the vehicle seating assembly, illustrating the lower leg support in the deployed position and the stowed position (shown in phantom), as well as the inflatable members that are provided on the vehicle seating assembly in an inflated state, according to one example.
Figure 5:
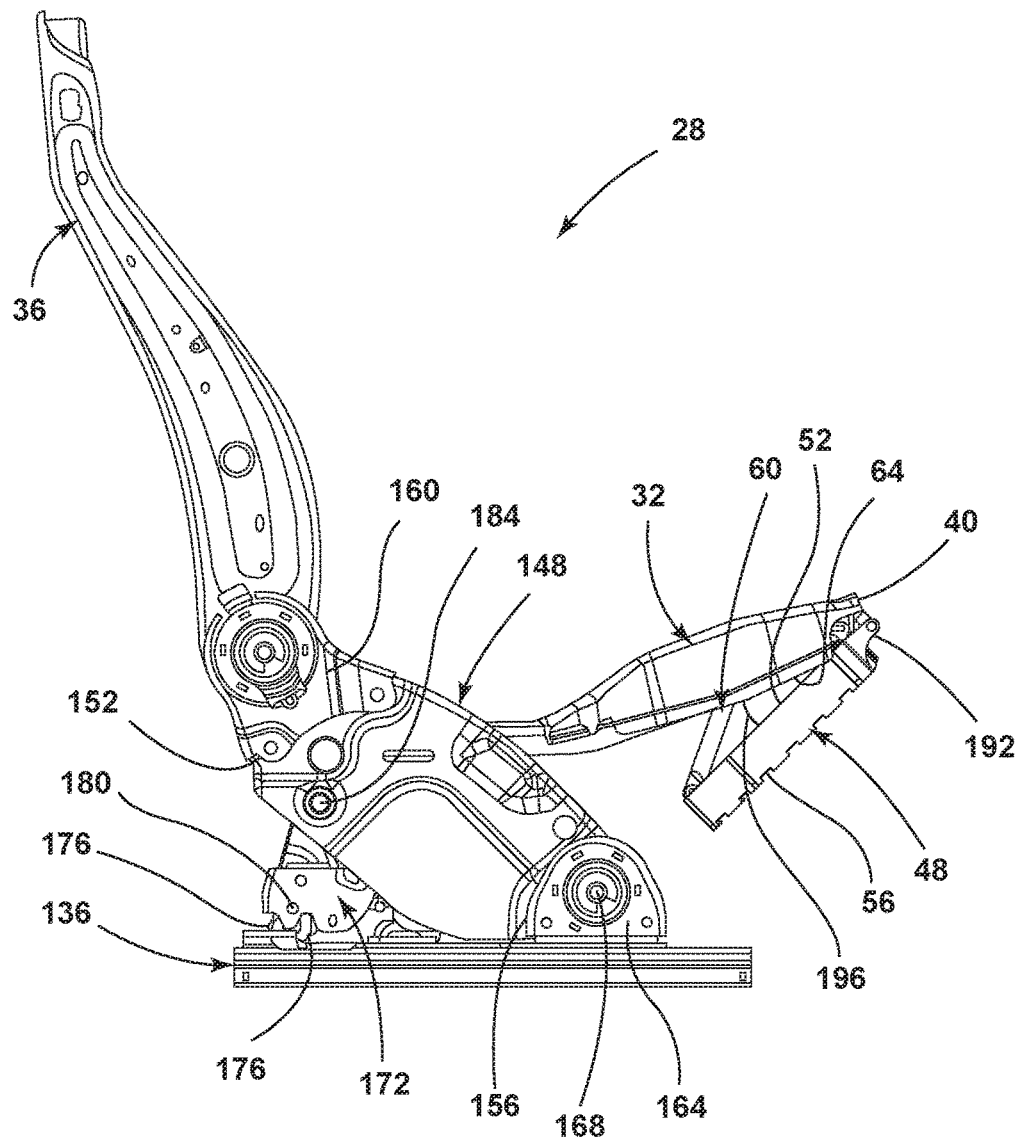
FIG. 5 is a side view of the vehicle seating assembly, illustrating the lower leg support in a stowed position, according to one example.

Referring now to FIGS. 2-4, the vehicle seating assembly 28 is shown with a front portion 84 of the seat 32 removed (FIGS. 3 and 4). Similarly, the lower leg support 48 is depicted with a cushion 88, a coverstock 92, and a closeout panel 96 removed (FIGS. 3 and 4). With the front portion 84 of the seat 32 removed, a frame member 100 of the seat 32 is exposed. The frame member 100 of the seat 32 can be utilized as a mounting structure for the linkage assembly 60 of the lower leg support 48. In the depicted example, the frame member 100 is U-shaped. With the cushion 88, the coverstock 92, and/or the closeout panel 96 removed from the lower leg support 48, it is possible to see internal components of the lower leg support 48, as well as the engagement between various components of the vehicle seating assembly 28. The lower leg support 48 can be provided with one or more pivot protrusions 104. The pivot protrusions 104 are positioned on a proximate end 108 of the lower leg support 48. The proximate end 108 of the lower leg support 48 is positioned nearest the seat 32 and is the end of the lower leg support 48 that is pivotably coupled to the seat 32. The lower leg support 48 also includes a distal end 112 that is opposite the proximate end 108. The distal end 112 of the lower leg support 48 may alternatively be referred to as a free end of the lower leg support 48. The distal end 112 of the lower leg support 48 describes an arc of rotation as the lower leg support 48 is transitioned between the stowed position (shown in phantom) and the deployed position. The pivot protrusions 104 at the proximate end 108 of the lower leg support 48 engage with corresponding structures on the seat 32 (see FIG. 6). The lower leg support 48 and the seat 32 may be pivotably coupled at the pivot protrusions 104 and the corresponding structures on the seat 32, for example, by a retention pin inserted through the pivot protrusions 104 and the corresponding structures on the seat 32.

Referring again to FIGS. 2-4, the vehicle seating assembly 28 can include an air bladder assembly 116. The air bladder assembly 116 can include a calf portion 120 and a thigh portion 124. The calf portion 120 of the air bladder assembly 116 is positioned on the exterior surface 56 of the lower leg support 48. The thigh portion 124 of the air bladder assembly 116 is positioned on the seat 32 proximate to the forward end 40 of the seat 32. In various examples, the calf portion 120 and the thigh portion 124 are coupled to a common air supply 128. The air bladder assembly 116 is made up of a plurality of inflatable members 132. In some examples, the vehicle seating assembly 28 may be coupled to the floor 76 of the vehicle 20 by way of a rail assembly 136. The rail assembly can include a lower rail 140 that is mounted to the floor 76 of the vehicle 20 and an upper rail 144 that is coupled to the vehicle seating assembly 28 and engages with the lower rail 140 such that slidable engagement along the length of the rail assembly 136 is possible.

Referring to FIGS. 5-8, the vehicle seating assembly 28 can be coupled to the rail assembly 136 by a frame bracket 148. The frame bracket 148 has an upper portion 152 and a lower portion 156. The upper and lower portions 152, 156 of the frame bracket 148 may be angularly offset from one another when assembled to the vehicle seating assembly 28 and the rail assembly 136. Said another way, the frame bracket 148 may extend rearwardly at an angle from the rail assembly 136 when the vehicle seating assembly 28 is in the use position pictured in FIG. 5. The seat 32 is coupled to the frame bracket 148 at the rearward end 44 of the seat. A hinge bracket 160 can be coupled to the upper portion 152 of the frame bracket 148. The hinge bracket 160 extends upward from the upper portion 152 of the frame bracket 148 and receives a portion of the seatback 36. The coupling between the seatback 36 and the hinge bracket 160 enables pivotable movement of the seatback 36 relative to the seat 32. A rail engagement bracket 164 is coupled to the lower portion 156 of the frame bracket 148. The rail engagement bracket 164 engages with the rail assembly 136, proximate to the forward end 40 of the seat 32. The rail engagement bracket 164 can enable rotational motion of the vehicle seating assembly 28 about a rotation axis 168 defined by the rail engagement bracket 164. Rotational motion of the vehicle seating assembly 28 about the rotation axis 168 of the rail engagement bracket 164 can be initiated by a disengagement of a striker assembly 172 that is coupled to the frame bracket 148. The striker assembly 172 is rotatably coupled to the frame bracket 148 proximate to the rearward end 44 of the seat 32. The striker assembly 172 is configured to releasably engage with the rail assembly 136. The striker assembly 172 is provided with retention members 176 that are rotatable about a rotation axis 180 such that the retention members 176 open and close in a claw-like fashion. The retention members 176 may close around a striker bar provided on the rail assembly 136. The retention members 176 can be released from engagement from the striker bar by actuation of a button, actuation of a tether, or another suitable arrangement that induces the retention members 176 to rotate or pivot about the rotation axis 180 such that the retention members 176 increase a distance between the individual retention members 176 and assume an open position in a claw-like manner. Upon release between the striker assembly 172 and the rail assembly 136, the vehicle seating assembly 28 is pivotable about the rotation axis 168 of the rail engagement bracket 164 to the forward-pitched position. Upon release of the striker assembly 172 from the rail assembly 136, the striker assembly 172 may rotate inwardly (e.g., in a counter-clockwise direction) toward the frame bracket 148 about rotation axis 184. Accordingly, after the striker assembly 172 is disengaged from the rail assembly 136, the striker assembly 172 may tuck into the frame bracket 148 such that the striker assembly 172 does not substantially increase a profile of the vehicle seating assembly 28, which may decrease tripping hazards for ingress and egress while also providing additional space for the ingress and egress of occupants or cargo.

Referring again to FIGS. 5-8, the lower leg support 48 is pivotably coupled to the forward end 40 of the seat 32 by way of an engagement between the pivot protrusions 104 of the lower leg support 48 and a seat protrusion 188 that extends outwardly from the forward end 40 of the seat 32. The engagement between the pivot protrusions 104, the lower leg support 48, and the seat protrusion 188 of the seat 32 can be maintained by the insertion of a retention pin into, and ultimately extending through, retention apertures 192 that are defined by the pivot protrusions 104 and the seat protrusion 188. When the lower leg support 48 is in the stowed position, as depicted in FIGS. 5-8, the lower leg support 48 is positioned in an area directly below the seat 32. When the lower leg support 48 is in the stowed position, the lower leg support 48 forms an angle 196 with the seat 32. The angle 196 between the lower leg support 48 and the seat 32 when the lower leg support 48 is in the stowed position is an acute angle (i.e. less than 90°). For example, the angle 196 between the lower leg support 48 and the seat 32 when the lower leg support 48 is in the stowed position can be less than 90°, less than 75°, less than 60°, less than 45°, less than 30°, less than 15°, greater than 0°, greater than 10°, greater than 20°, greater than 30°, greater than 40°, greater than 50°, greater than 60°, greater than 70°, greater than 80°, and/or combinations or ranges thereof.

Referring further to FIGS. 7-10, the linkage assembly 60 is coupled to the underside 64 of the seat 32, as well as to the interior surface 52 of the lower leg support 48. The linkage assembly 60 is responsible for transitioning the lower leg support 48 between the stowed position and the deployed position. In various examples, the linkage assembly 60 includes one or more guide tracks 200 that are coupled to the interior surface 52 of the lower leg support 48. The linkage assembly 60 can also include a motor 204 that is directly coupled to, and carried by, the interior surface 52 of the lower leg support 48. A lead screw 208 can be coupled to the lower leg support 48 in a manner that positions the lead screw 208 parallel to the one or more guide tracks 200. The lead screw 208 has a first end 212 and a second end 216. The first end 212 of the lead screw 208 is directly coupled to the motor 204 such that the motor 204 imparts rotational motion to the lead screw 208. A drive nut 220 is engaged with the lead screw 208 such that rotation of the lead screw 208 affects movement of the drive nut 220 along a length of the lead screw 208. In various examples, the drive nut 220 can be integrated, or unitarily formed, with a synchronizing bracket 224. Adjustment of the drive nut 220, along the length of the lead screw 208 adjusts a rotational position of the lower leg support 48, For example, actuation of the lead screw 208 affects actuation of the drive nut 220 along the lead screw 208 and can result in the adjustment of a rotational position of the lower leg support 48 between the stowed position, an intermediate position, and the deployed position. In some examples, the one or more guide tracks 200 include a first guide track 228 and a second guide track 232. The first and second guide tracks 228, 232 are spaced apart from one another along a horizontal direction of the interior surface 52 of the lower leg support 48, with the first and second guide tracks 228, 232 being parallel to one another.

Referring again to FIGS. 7-10, the synchronizing bracket 224 of the linkage assembly 60 is coupled to the drive nut 220, such that actuation of the drive nut 220, along the lead screw 208 affects corresponding actuation of the synchronizing bracket 224 along the lead screw 208. In the depicted examples, the drive nut 220 may be integrally or unitarily formed with the synchronizing bracket 224. The synchronizing bracket 224 can include coupling brackets 236 that may be positioned on opposing ends of the synchronizing bracket 224. For example, the coupling brackets 236 may be positioned at a first end 240 and a second end 244 of the synchronizing bracket 224. The first end 240 of the synchronizing bracket 224 is associated with the first guide track 228 and the second end 244 of the synchronizing bracket 224 is associated with the second guide track 232. A first linkage arm 248 is coupled to the first end 240 of the synchronizing bracket 224 and also associated with the first guide track 228, A second linkage arm 252 is coupled to the second end 244 of the synchronizing bracket 224 and is associated with the second guide track 232. A first end 256 of each of the first and second linkage arms 248, 252 engages with the coupling brackets 236 at the first and second ends 240, 244 of the synchronizing bracket 224, respectively. The first ends 256 of the linkage arms 248, 252 are coupled to the coupling brackets 236 of the synchronizing bracket 224 in a manner that permits pivotable movement about a rotational axis defined by an aperture defined by each of the coupling brackets 236, The first ends 256 of the first and second linkage arms 248, 252 can be retained to the coupling brackets 236 by way of a fastener that extends through the aperture in the coupling brackets and into corresponding apertures in the first ends 256 of the first and second linkage arms 248, 252.

Referring further to FIGS. 7-10, the first and second linkage arms 248, 252 extend from the interior surface 52 of the lower leg support 48 toward the seat 32 of the vehicle seating assembly 28. The underside 64 of the seat 32 can be provided with a carrier bracket 260 that is mounted to the underside 64 of the seat 32. A second end 264 of each of the first and second linkage arms 248, 252 is coupled to the carrier bracket 260 such that the linkage arms 248, 252 extend between the carrier bracket 260 on the underside 64 of the seat 32 to the coupling brackets 236 of the synchronizing bracket 224 that are carried by the interior surface 52 of the lower leg support 48. In addition to the first end 256 of the linkage arms 248, 252 being pivotably coupled to the coupling brackets 236, the second ends 264 of the first and second linkage arms 248, 252 are pivotably coupled to the seat 32 by way of the carrier bracket 260. More specifically, the carrier bracket 260 is pivotable about a horizontal axis that is defined by a pivot shaft 268 that extends through receiving portions 272 on the carrier bracket 260 and engages with a bushing bracket 276. The bushing bracket 276 can receive a bushing 280 that is provided at the second ends 264 of the first and second linkage arms 248, 252, which may dampen vibrations associated with the actuation of the lower leg support 48 between the stowed and deployed positions. The bushing 280, and ultimately the second end 264 of the first and second linkage arms 248, 252, can be offset from the pivot shaft 268 of the carrier bracket 260 to prevent binding or sticking of the first and second linkage arms 248, 252 when the linkage assembly 60 is in a compressed state, such as that associated with the stowed position of the lower leg support 48. Accordingly, as the carrier bracket 260 pivots about the horizontal axis defined by the pivot shaft 268 as the lower leg support 48 is transitioned between the stowed position and the deployed position, the bushing 280 and the second ends 264 of the first and second linkage arms 248, 252 can be horizontally and/or vertically offset from the axis of rotation provided by the pivot shaft 268. The first and second linkage arms 248, 252 are extendable from a compressed position to an extended position, with the compressed position being associated with the stowed position of the lower leg support 48 and the extended position being associated with the deployed position of the lower leg support 48.

Referring further to FIGS. 7-10, the first and second linkage arms 248, 252 can be biased towards the extended position. With the stowed position of the lower leg support 48 forming an acute angle between the seat 32 and the lower leg support 48, and with the first and second linkage arms 248, 252 being biased to the extended position, if the second ends 264 of the first and second linkage arms 248, 252 were not offset from the pivot shaft 268 that defines the horizontal axis about which the carrier bracket 260 is rotated, then actuation of the motor 204 in an attempt to transition the lower leg support 48 from the stowed position to the deployed position may result in a binding or sticking of the linkage assembly 60. The binding or sticking can arise due to the force applied by the bias of the first and second linkage arms 248, 252 generally opposing actuation of the drive nut 220 along the lead screw 208, particularly when the lower leg support 48 is exiting the stowed position. Said another way, by offsetting the second ends 264 of the first and second linkage arms 248, 252 from the pivot shaft 268, it is possible to orient the first and second linkage arms 248, 252 at an angle relative to the lower leg support 48 that is nonparallel to the angle at which the lower leg support 48 is oriented to the seat 32 when in the stowed position. For example, if a terminal end of the second end 264 of the first and second linkage arms 248, 252 were in line with, or abutting, the pivot shaft 268 or the receiving portions 272 in a manner that allowed for a straight line to be drawn from the first end 256 along the first and second linkage arms 248, 252, through the second end 264, and ultimately passing through the pivot shaft 268, then the first and second linkage arms 248, 252 may be oriented relative to the lower leg support 48 in a manner that is closer to a parallel relationship with the lower leg support 48 in the stowed position, Such an arrangement of the linkage assembly 60 may require the first and second linkage arms 248, 252 to compress further as the lower leg support 48 is actuated from the stowed position toward the deployed position. Such an arrangement may be accomplished by providing the first and second linkage arms 248, 252 as not being in a fully compressed state in the stowed position of the lower leg support 48, however, a binding or sticking resulting from the extension force of the first and second linkage arms 248, 252 may still exist. Accordingly, in the present arrangement of the linkage assembly 60, the first and second linkage arms 248, 252 are able to assume a more obtuse angle with the lower leg support 48. It may be beneficial to avoid an arrangement where the first and second linkage arms 248, 252 are coupled at their terminal ends of their second ends 264 directly to the pivot shafts 268 or the receiving portions 272 such that a straight line or cross-section may be taken through the receiving portions 272, the pivot shafts 268, the second end 264, and the first end 256 of the first and second linkage arms 248, 252.

Referring still further to FIGS. 7-10, the stowed position of the lower leg support 48 can position the drive nut 220 and/or the synchronizing bracket 224 nearest to the distal end 112 of the lower leg support 48. Actuation of the drive nut 220 and ultimately the synchronizing bracket 224 from the distal end 112 of the lower leg support 48 toward the proximate end 108 of the lower leg support 48 transitions the lower leg support 48 from the stowed position toward the deployed position. As the drive nut 220, and ultimately the synchronizing bracket 224, are actuated from the distal end 112 of the lower leg support 48, the angular position or orientation between the lower leg support 48 and the seat 32 moves from an acute angle toward a right angle and ultimately to an obtuse angle when the lower leg support 48 reaches the deployed position. In various examples, a distance between the synchronizing bracket 224 and the seat 32 or the frame member 100 of the seat 32 may be at its lowest when the lower leg support 48 is at an intermediate position between the stowed position and the deployed position.

Referring now to FIGS. 5-12, various examples of the present disclosure include three unique pivot points that are associated with actuation of the lower leg support 48 between the stowed position and the deployed position, with each of the three unique pivot points being interrelated and interdependent upon one another. One of the pivot points is defined by the retention apertures 192 in the seat protrusion 188 and the pivot protrusions 104 of the lower leg support 48, another of the pivot points is defined by the coupling of the first and second linkage arms 248, 252 to the synchronizing bracket 224, and the final pivot point is defined by the pivot shaft 268 of the carrier bracket 260. Rotational or pivotable movement about one of these pivot points induces rotational or pivotable movement about the remaining pivot points. Pivoting or rotating motion is initiated by actuation of the motor 204, which drives the lead screw 208 to rotate, thereby affecting actuation of the drive nut 220 along the length of the lead screw 208. For example, initiating actuation of the motor 204 such that rotation is imparted to the lead screw 208 results in actuation of the drive nut 220 from the distal end 112 of the lower leg support 48 toward the motor 204 and the proximate end 108 of the lower leg support 48. This motion of the drive nut 220 and the synchronizing bracket 224 ultimately results in movement of the lower leg support 48 from the stowed position to the deployed position and initiates pivoting or rotating motion about each of the three unique pivot axes or rotation axes. Accordingly, as the drive nut 220 and the synchronizing bracket 224 are actuated from the distal end 112 of the lower leg support 48 toward the proximate end 108 of the lower leg support 48, the angular orientation or relationship between the lower leg support 48, the seat 32, and the first and second linkage arms 248, 252 is adjusted. The freedom of rotatable or pivotable motion about each of the three unique pivot axes enables the adjustment of the angular orientation or relationship between the components of the linkage assembly 60 and the lower leg support 48. As the lower leg support 48 is actuated between the stowed position and the deployed position, each component of the linkage assembly 60 that does not define one of the pivot axes, changes its angular orientation or relationship with the seat 32.

Referring again to FIGS. 5-12, the air bladder assembly 116 is provided on the exterior surface 56 of the lower leg support 48, as well as on a portion of the seat 32 that is proximate to the forward end 40 of the seat 32. The portion of the air bladder assembly 116 that is positioned on the exterior surface 56 of the lower leg support 48 is the calf portion 120 of the air bladder assembly 116. The portion of the air bladder assembly 116 that is positioned proximate to the forward end 40 of the seat 32, and upon the seat 32, is the thigh portion 124 of the air bladder assembly 116. The calf portion 120 and the thigh portion 124 of the air bladder assembly 116 are provided with a plurality of the inflatable members 132. In various examples, the inflatable members 132 may be independently inflatable by the common air supply 128 that is shared by the air bladder assembly 116. In some examples, the inflatable members 132 that are positioned as the calf portion 120 of the air bladder assembly 116 may be arranged in a shingled fashion such that the individual inflatable members 132 overlap with one another and may further actuate the cushion of the lower leg support 48 by having the individual inflatable members 132 act upon one another rather than solely acting upon the exterior surface 56 of the lower leg support 48.

Figure 13:
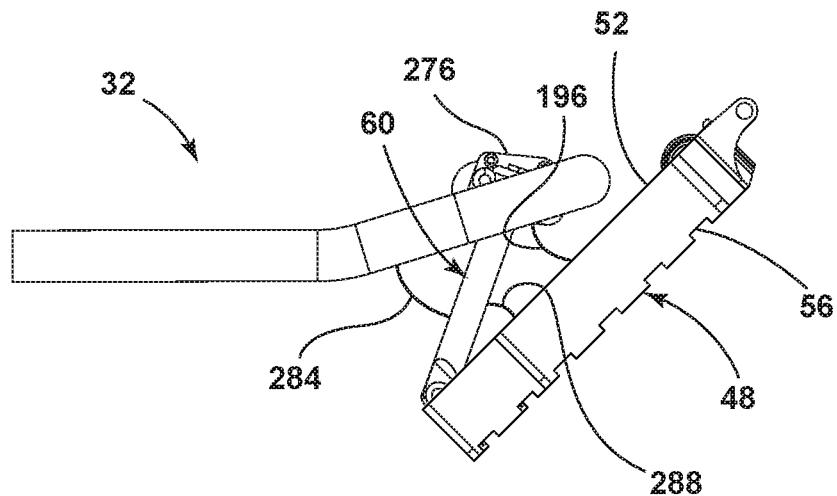
FIG. 13 is a side view of the coupling between the lower leg support and the seat, illustrating the lower leg support in the stowed position, according to one example.
Figure 14:
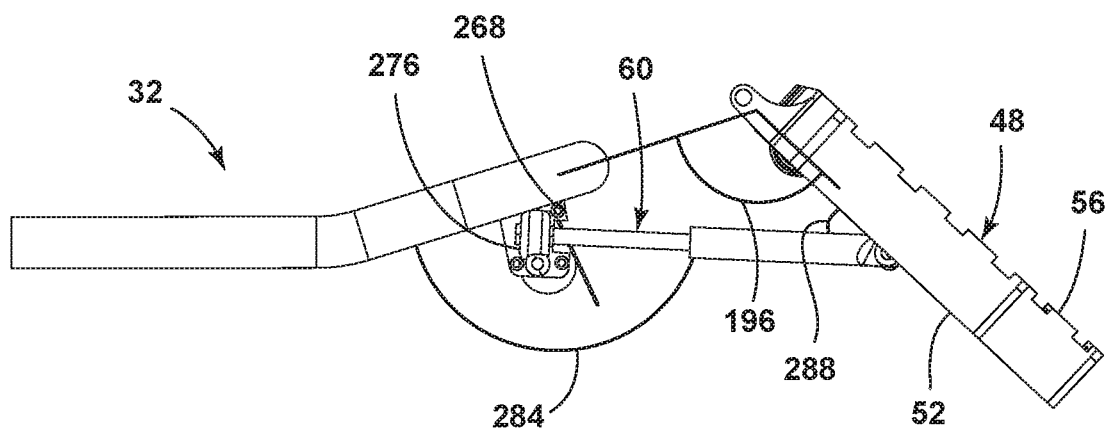
FIG. 14 is a side view of the coupling between the lower leg support and the seat, with the lower leg support in the deployed position, according to one example.

Referring to FIGS. 13-14, in various examples of the present disclosure, the lead screw 208 and the threads that extend from the exterior surface of the lead screw 208 engage with corresponding threads provided upon an interior circumference of the drive nut 220. Accordingly, the engagement between the threads on the lead screw 208 and the threads on the drive nut 220 provide a continuous lock or retention of the lower leg support 48 in a given position as the drive nut 220 is actuated along the length of the lead screw 208 by the motor 204. The first and second linkage arms 248, 252 can aid in the deployment of the lower leg support 48 and in some examples, may provide some additional support to the lower leg support 48 when the lower leg support 48 is in the extended position or an intermediate position between the stowed position and the deployed position. Absent the coupling of the first and second linkage arms 248, 252, or a similar structure, the lower leg support 48 would not be capable of actuation from the stowed position to the deployed position by merely actuating the lead screw 208. Specifically, the first and second linkage arms 248, 252 may be provided with a biasing force that biases the first and second linkage arms 248, 252 to the extended position. Accordingly, as the lead screw 208 is rotated by the motor 204 and the drive nut 220 is actuated along the length of the lead screw 208, a point at which the first and second linkage arms 248, 252 are acting upon the lower leg support 48 is adjusted and thereby affects the actuation of the lower leg support 48 from the stowed position to the deployed position. Additionally, by allowing the carrier bracket 260 to rotate relative to the seat 32, the lower leg support 48 is able to move through a greater degree of rotational freedom than if the carrier bracket 260 were not permitted to rotate relative to the seat 32. The rotation of the carrier bracket 260 results in an adjustment of the direction of the extension force applied by the first and second linkage arms 248, 252 such that the biasing force that urges the first and second linkage arms 248, 252 to the extended position can serve as a force that maintains the lower leg support 48 in a given position in concert with the threadable engagement between the lead screw 208 and the drive nut 220. For example, the biasing force that may be provided to the first and second linkage arms 248, 252 may aid in retaining the lower leg support 48 in the stowed position as a result of the acute angle formed between the lower leg support 48 and the seat 32. Additionally the arrangement of the first and second linkage arms 248, 252 orients the first and second linkage arms 248, 252 rearwardly of a vertical axis and rearwardly of an axis that is perpendicular to the incline of the seat 32 such that the first and second linkage arms 248, 252 form an acute angle with the underside 64 of the seat 32 that is angled toward the rearward end 44 of the seat 32. Accordingly, the extension force provided by the first and second linkage arms 248, 252 is directed toward the rear of the vehicle seating assembly 28 and encourages the lower leg support 48 to remain in the stowed position. The threadable engagement between the lead screw 208 and the drive nut 220 also aids in retention of the lower leg support 48 in the stowed position.

Referring again to FIGS. 13-14, the extension force provided by the first and second linkage arms 248, 252 may aid in reducing vibration of the components of the linkage assembly 60 such that buzzing, humming, rattling, and various other noises may be reduced while the vehicle 20 is in motion or the linkage assembly 60 is being actuated. Similarly, when the lower leg support 48 is in the deployed position the biasing force provided to the first and second linkage arms 248, 252 that urges the first and second linkage arms 248, 252 to the extended position is oriented forward of the vehicle seating assembly 28 such that the lower leg support 48 is maintained in the deployed position. Additionally, the biasing force provided to the first and second linkage arms 248, 252, working in concert with the threadable engagement between the lead screw 208 and the drive nut 220, resists the forces applied by a user resting their lower legs upon the lower leg support 48, and may additionally aid in taking up slack or tolerances provided between the various components of the linkage assembly 60 such that the user is provided with a firm engagement to their lower legs by the lower leg support 48 without the lower leg support 48 yielding or giving way to an excessive degree as a result of the application of the force or weight of the users lower legs.

Referring to FIGS. 13-14, between the seat 32, the first and second linkage arms 248, 252, and the lower leg support 48 are adjusted as the lower leg support 48 is transitioned between the stowed position and the deployed position. The angle 196 between the lower leg support 48 and the seat 32 can be taken as the angle between the frame member 100 of the seat 32 to which the carrier bracket 260 is mounted to the lower leg support 48. An angle 284 between the seat 32 and/or the frame member 100 and the first and second linkage arms 248, 252 is also adjusted as the lower leg support 48 is transitioned between the stowed position and the deployed position. An angle 288 between the first and second linkage arms 248, 252 and the lower leg support 48 is also adjusted as the lower leg support 48 is transitioned between the stowed position and the deployed position. When in the stowed position, each of the angles 196, 284, 288 between the various components of the linkage assembly 60, the seat 32, and the lower leg support 48 may form acute angles. When in the deployed position (FIG. 14), the angle between the seat 32 and the lower leg support 48, as well as the angle between the first and second linkage arms 248, 252 and the seat 32 may transition from acute angles to obtuse angles. However, the angle 288 between the first and second linkage arms 248, 252 and the lower leg support 48 may remain an acute angle. In some examples, the angle 288 between the first and second linkage arms 248, 252 and a lower leg support 48 may remain constant or nearly constant throughout the actuation of the lower leg support 48 between the stowed position and the deployed position. For example, the angle 288 between the first and second linkage arms 248, 252 and the lower leg support 48 may remain within about 5°, about 10°, or about 15° when transitioning between the stowed position and the deployed position of the lower leg support 48. The maintenance of the angle 288 between the linkage arms 248, 252 and the lower leg support 48 has an acute angle throughout transitioned between the stowed position and the deployed position of the lower leg support 48 and can be facilitated by the rotation of the carrier bracket 260 about the pivot shaft 268. In the transition from the stowed position to the deployed position of the lower leg support 48, the carrier bracket 260 may rotate from a generally horizontal position to a generally vertical position. Similarly, in the transition from the stowed position of the lower leg support to the deployed position of the lower leg support, the first and second linkage arms 248, 252 transition from a generally or substantially vertical position when the lower leg support 48 is in the stowed position to a substantially horizontal position when the lower leg support 48 is in the deployed position.

Figure 15:
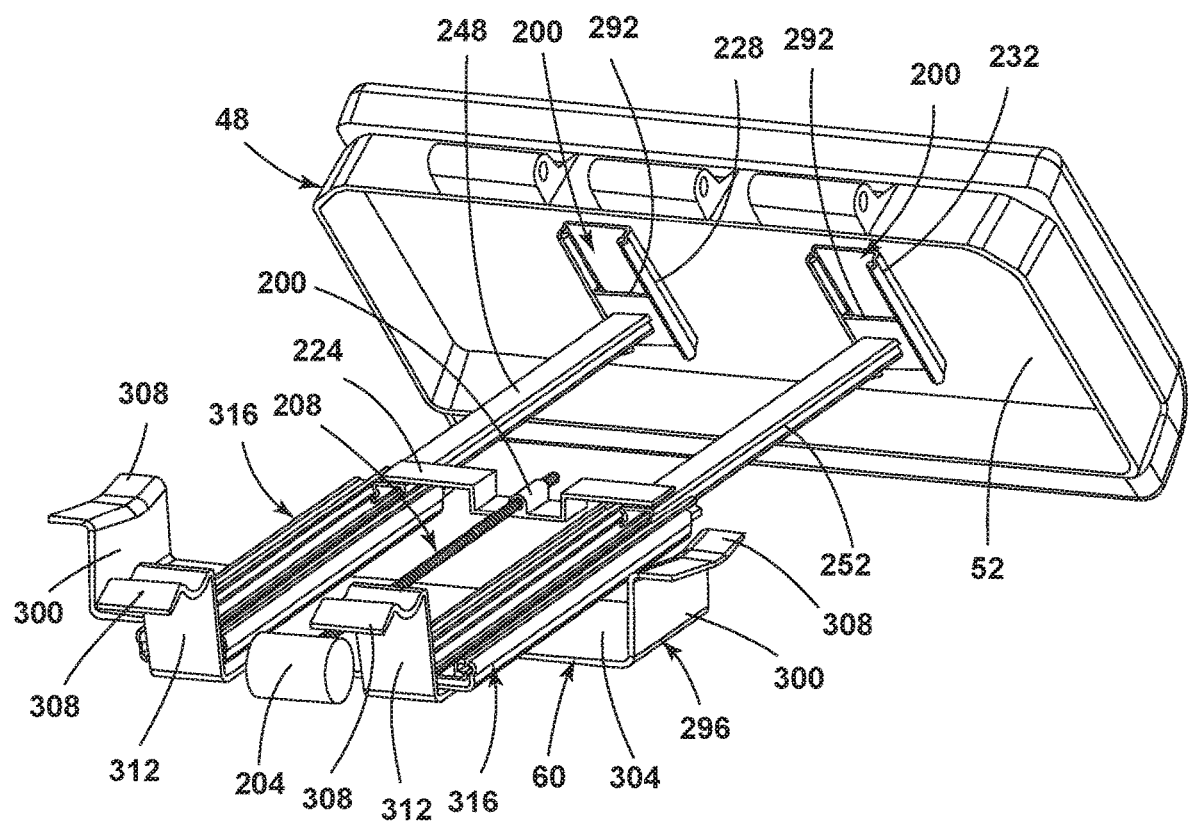
FIG. 15 is a rear perspective view of an example of the linkage assembly coupled to the lower leg support, with the lower leg support in the extended position, according to one example.

Referring now to FIG. 15, an alternative example of the linkage assembly 60 is depicted for transitioning the lower leg support 48 between the stowed position and the deployed position. In the depicted example, the guide tracks 200 are positioned on the interior surface 52 of the lower leg support 48. The guide tracks 200 include the first guide track 228 and the second guide track 232. The first and second guide tracks 228, 232 each receive a slider bracket 292 that slidably engages with the guide tracks 200. The slider brackets 292 are pivotably coupled to the end of the first and second linkage arms 248, 252. Accordingly, an angular orientation or relationship between the lower leg support 48 and the first and second linkage arms 248, 252 can be adjusted as the lower leg support 48 is transitioned between the stowed position and the deployed position. However, in the depicted example, the angular orientation of the first and second linkage arms 248, 252 relative to the seat 32 may remain constant. The linkage assembly 60 of the depicted example can be provided with a seat mounting bracket 296 that engages with the underside 64 of the seat 32. The seat mounting bracket 296 may be generally U-shaped and include vertically extending legs 300 that are coupled to one another by a connecting member 304 that extends laterally between the vertically extending legs 300. Ends of the vertically extending legs 300 that are opposite to ends of the vertically extending legs 300 that are coupled by the connecting member 304 can be provided with seat engagement sections 308 that directly engage with an underside of the seat 32 or a component of the seat 32 that is positioned along the underside 64 of the seat 32. The seat mounting bracket 296 may further include rearwardly extending legs 312 that are coupled to the connecting member 304 that extends between the vertically extending legs 300. The rearwardly extending legs 312 of the seat mounting bracket 296 can also include seat engagement sections 308 that engage with the underside 64 of the seat 32 or with components of the seat 32 that are positioned upon the underside 64 of the seat 32. The connecting member 304 and/or the rearwardly extending legs 312 of the seat mounting bracket 296 can be utilized as a surface upon which components of the linkage assembly 60 are mounted and supported. In the depicted example, the linkage assembly 60 includes extension tracks 316 that receive the first and second linkage arms 248, 252. Each of the extension tracks 316 receives one of either the first linkage arm 248 or the second linkage arm 252. For example, the first linkage arm 248 may be received in a first extension track 316 that corresponds to the first linkage arm 248 while the second linkage arm 252 is received in a second one of the extension tracks 316 that corresponds with the second linkage arm 252. The first and second linkage arms 248, 252 are extendable along the extension tracks 316 by way of the motor 204. In the depicted example, the motor 204 drives the lead screw 208 in a manner similar to that described above. The lead screw 208 engages with the drive nut 220 in a manner also similar to that described above. The drive nut 220 can be integrally or unitarily formed with the synchronizing bracket 224. Accordingly, as the lead screw 208 is rotated by the motor 204, the drive nut 220 is actuated along the length of the lead screw 208 and thereby affects actuation of the synchronizing bracket 224. The synchronizing bracket 224 is coupled to the first and second linkage arms 248, 252 and thereby synchronizes actuation of the first and second linkage arms 248, 252 along the extension tracks 316 in affecting actuation of the lower leg support between the stowed position and the deployed position.

Figure 16:
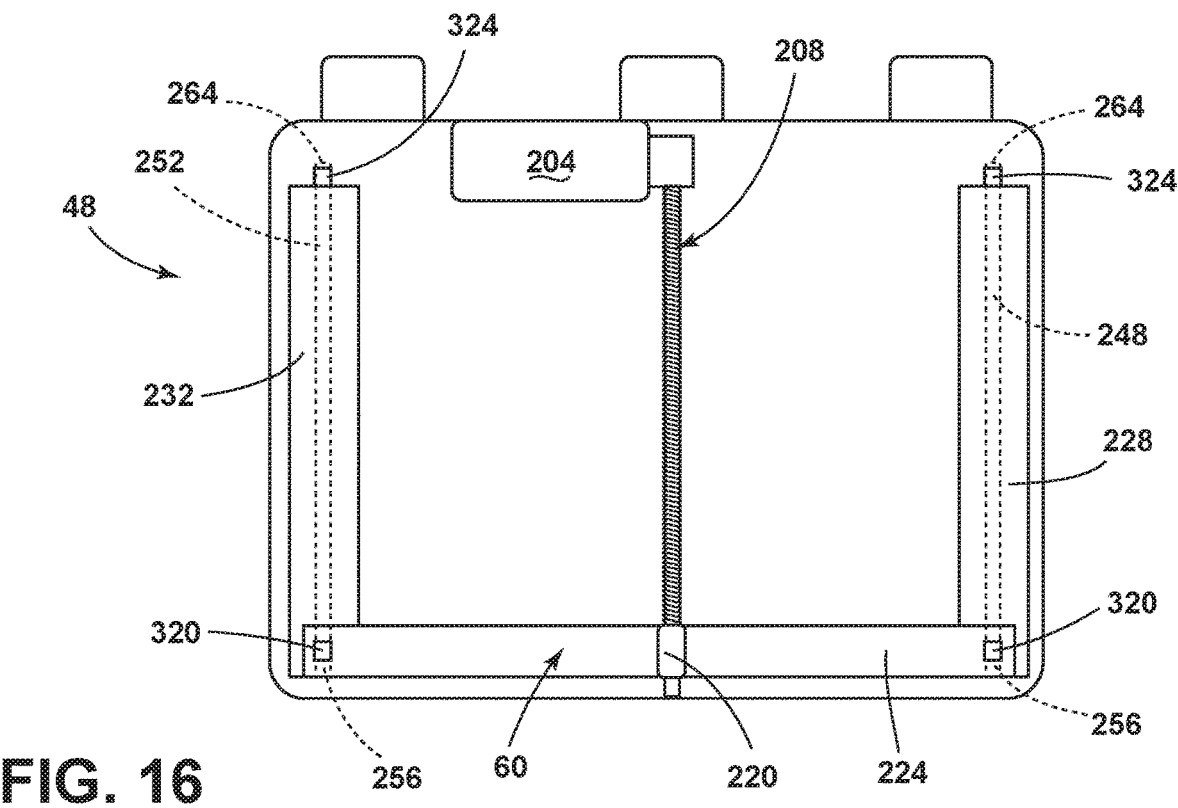
FIG. 16 is a top schematic view of the linkage assembly of the lower leg support, according to one example.
Figure 17:
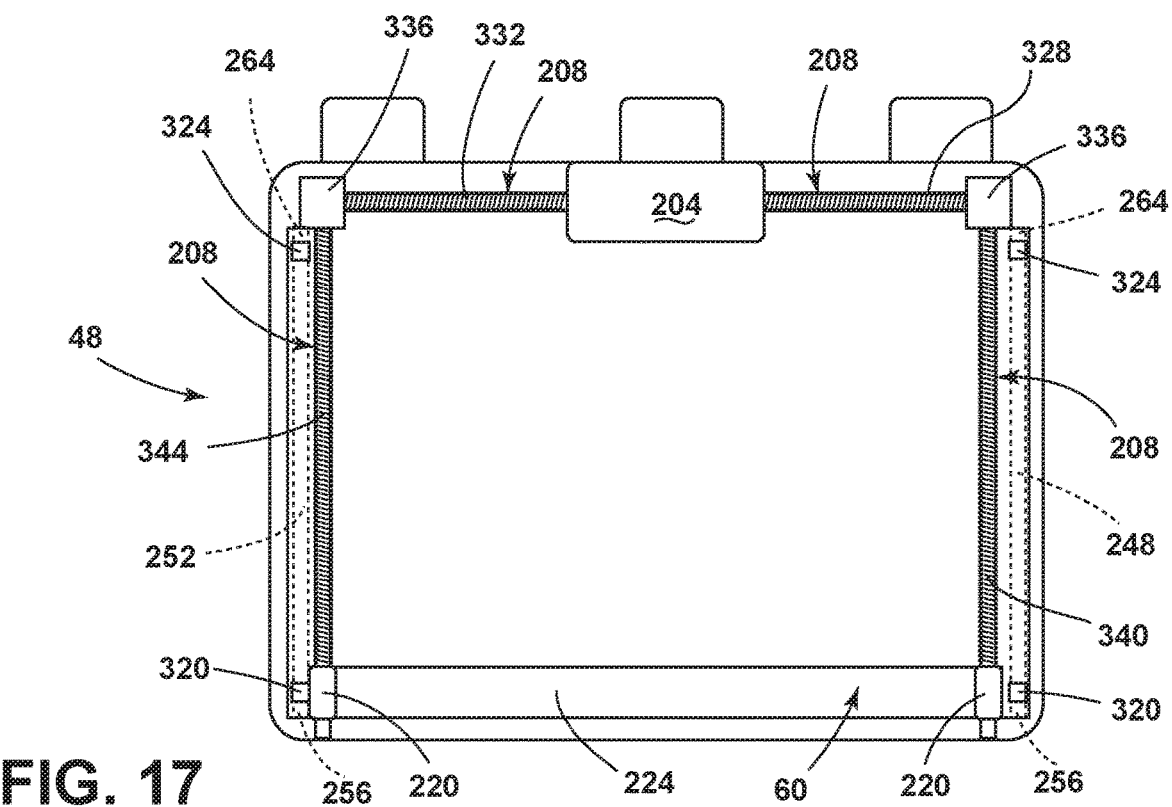
FIG. 17 is a top schematic view of the lower leg support, illustrating the linkage assembly, according to another example.

Referring now to FIGS. 16 and 17, in various examples, the motor 204 can be coupled to a single lead screw 208 that extends from the motor 204 to the drive nut 220. As discussed above, the drive nut 220 can be integrally or unitarily formed with the synchronizing bracket 224. In general, the synchronizing bracket 224 can synchronize actuation of the first and second linkage arms 248, 252 along the first and second guide tracks 228, 232 when a single one of the lead screws 208 is utilized. Pivot points 320 where the first and second linkage arms 248, 252 join with the synchronizing bracket 224 are positioned at the first ends 256 of the first and second linkage arms 248, 252 and are associated with the coupling between the first and second linkage arms 248, 252 and the synchronizing bracket 224. Pivot points 324 are depicted at the second ends 264 of the first and second linkage arms 248, 252 and are representative of the coupling between the first and second linkage arms 248, 252 and the seat 32 (e.g., coupling of the first and second linkage arms 248, 252 to the carrier bracket 260). In examples where more than one of the lead screws 208 is utilized, a single one of the motors 204 may be used by employing first and second transmission lead screws 328, 332 that extend to gearboxes 336 that engage with first and second extension lead screws 340, 344. The first and second transmission lead screws 328, 332 extend outwardly from the motor 204 and engage with the gearboxes 336. The first and second transmission lead screws 328, 332 transmit rotational motion imparted to the first and second transmission lead screws 328, 332 to the gearboxes 336 and ultimately affect rotation of the first and second extension lead screws 340, 344. The rotational motion of the first and second extension lead screws 340, 344 that is imparted by the gearboxes 336 and the first and second transmission lead screws 328, 332 as a result of actuation of the motor 204 effects rotation of the first and second extension lead screws 340, 344 thereby actuating the drive nuts 220 along the first and second extension lead screws 340, 344 and ultimately affecting actuation of the lower leg support 48 between the stowed position and the deployed position.

Figure 18:
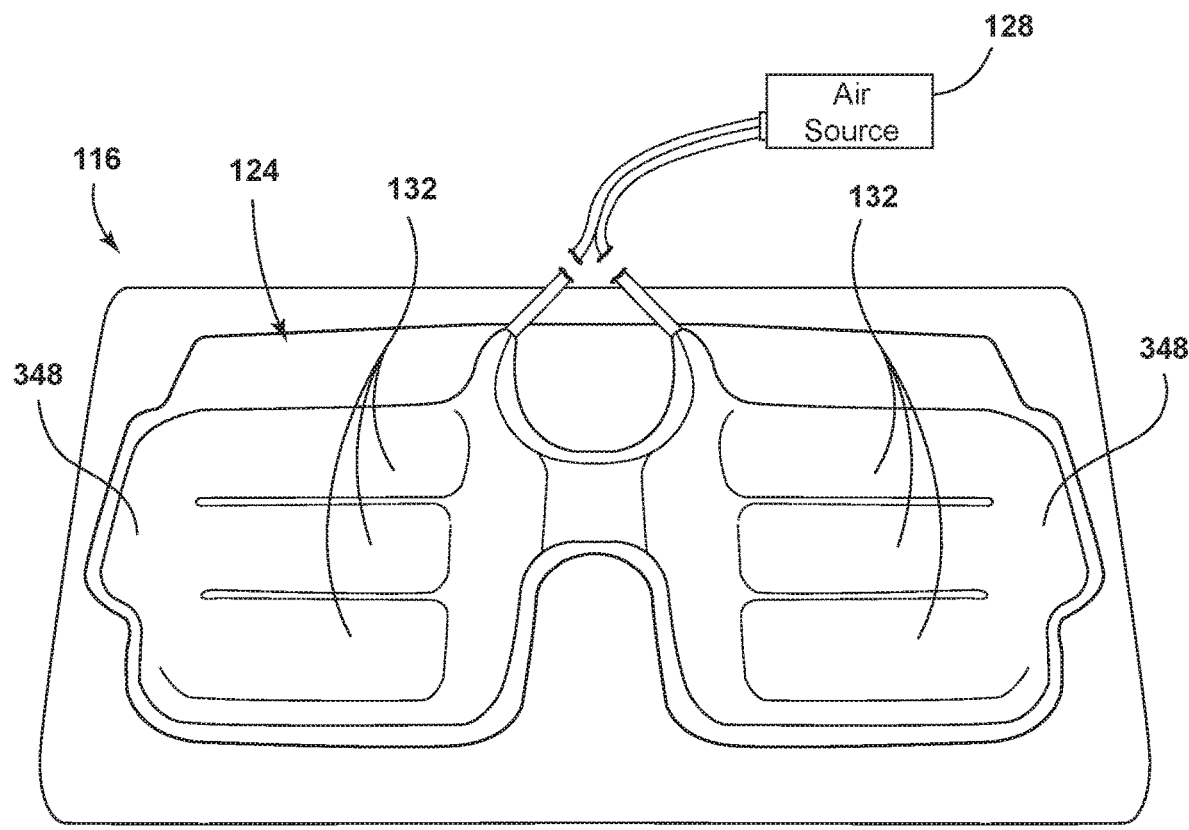
FIG. 18 is a front perspective view of a thigh portion of the air bladder assembly, according to one example.
Figure 19:
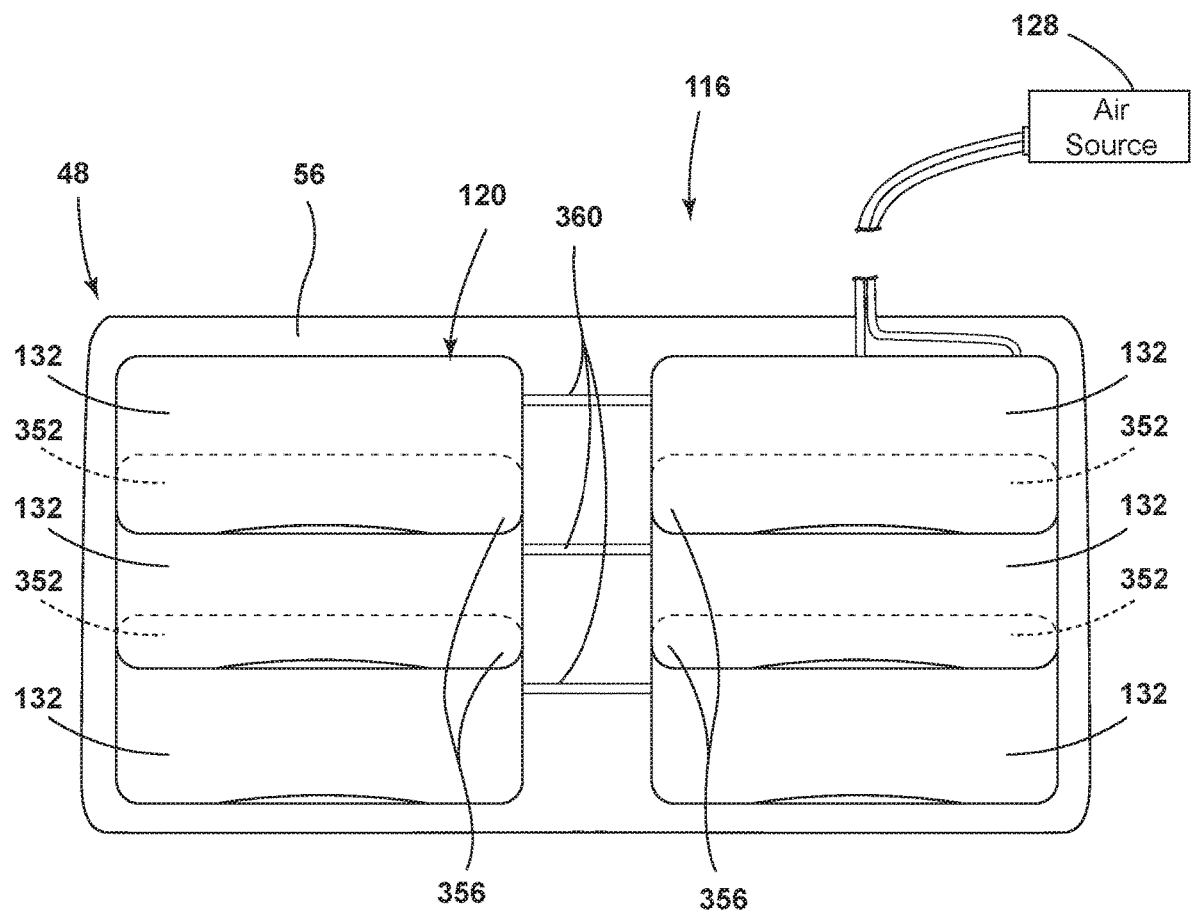
FIG. 19 is a top view of a calf portion of an air bladder assembly, according to one example.

Referring to FIGS. 18 and 19, the thigh portion 124 (FIG. 18) of the air bladder assembly 116 is provided with a plurality of the inflatable members 132. The inflatable members 132 of the thigh portion 124 of the air bladder assembly 116 may be independently inflatable by the air supply 128. In the depicted example, right and left portions of the thigh portion 124 may be independently inflatable. In some examples, such as that depicted here, adjacent inflatable members 132 may be in fluid communication with one another on one of the right or left portions of the thigh portion 124 such that redistribution of the air supplied to the inflatable members 132 may be passively accomplished by an adjustment or redistribution of the user's weight that is applied to the inflatable members 132. In the depicted example, the exterior edges 348 of the inflatable members 132 in the thigh portion 124 may be coupled to one another such that the inflatable members 132 on either the right or left portions of the thigh portion 124 are not discrete and isolated from one another, but rather the inflatable members 132 are capable of passively redistributing air or air pressure within the joined inflatable members 132 in response to a repositioning of the user's weight. In various examples of the calf portion 120 (FIG. 19) of the air bladder assembly 116, the inflatable members 132 may similarly be arranged in right and left portions. The inflatable members 132 positioned in the right portion and the left portion may be arranged in a shingled manner such that an upper portion 352 of an adjacent one of the inflatable members 132 (e.g., the bottom inflatable member 132) may be positioned underneath a lower portion 356 of an adjacent other one of the inflatable members 132 (e.g., the middle inflatable member 132). Said another way, inflatable members 132 that are lower than adjacent others of the inflatable members 132 may be positioned underneath the immediately adjacent upper inflatable members 132 such that the upper portion 352 of the lower adjacent inflatable member 132 is positioned below or underneath the lower portion 356 of the adjacent upper inflatable member 132, thereby providing the shingled arrangement of the inflatable members 132.

Referring again to FIGS. 18 and 19, in various examples, corresponding inflatable members 132 as oriented on the right portion and the left portion of the calf portion 120 of the air bladder assembly 116 may be fluidly coupled by way of conduits 360. The conduits 360 can enable air distribution between laterally adjacent ones of the inflatable members 132 that may be mirror images of one another on the right and left portions of the calf portion 120. The conduits 360 can enable passive redistribution of air similar to the thigh portions 124. The conduits 360 can enable passive redistribution of air between the right and left calf portions 120 as a result of a user adjusting their weight distribution upon the lower leg support 48. The conduits 360 may also enable the air supply 128 to be directly fluidly coupled to either the right portion or left portion of the calf portion 120 with the air being supplied first to the inflatable members 132 that are positioned on the side of the lower leg support 48 that is directly coupled to the air supply 128 and the conduits 360 transfer the air from the inflatable members 132 that are first inflated by the air supply 128 into the other side of the calf portion 120 of the air bladder assembly 116. While the air supply 128 may supply air to one side of the calf portion 120 first, this is not intended to be construed as the left or right portions of the calf portion 120 are first fully inflated prior to any inflation of the other of the right or left calf portions 120. Rather, it is possible for the air supply 128 to be fluidly coupled to the calf portion 120 of the air bladder assembly 116 in a manner that first flows air into one of the right portion or the left portion of the calf portion 120, at which point the air subsequently flows into the other of the right portion of the left portion of the calf portion 120. Therefore, it is possible to inflate both the right portion and the left portion of the calf portion 120 in a substantially simultaneous manner that is minimally perceptible from the standpoint of a differential pressure in the calf portion 120 as the inflatable members 132 are inflated.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle seating assembly, comprising:
    a seat having a forward end and a rearward end;
    a seatback pivotably coupled to the seat;
    a lower leg support having an interior surface and an exterior surface, the lower leg support rotatably coupled to the forward end of the seat, the lower leg support being movable between a stowed position and a deployed position, wherein the stowed position places the lower leg support in an area below the seat, wherein the stowed position of the lower leg support forms an acute angle with the seat, and wherein the lower leg support comprises a proximate end and a distal end, the proximate end of the lower leg support being rotatably coupled to the forward end of the seat;

a motor directly coupled to, and carried by, the interior surface of the lower leg support, wherein the motor is positioned at the proximate end of the lower leg support; and a linkage assembly coupled to an underside of the seat and the interior surface of the lower leg support, the linkage assembly being responsible for transitioning the lower leg support between the stowed position and the deployed position.

2. The vehicle seating assembly of claim 1, wherein the linkage assembly comprises:

one or more guide tracks directly coupled to the interior surface of the lower leg support;

a lead screw that is coupled to the lower leg support and is parallel to the one or more guide tracks, the lead screw having a first end and a second end, the first end of the lead screw being directly coupled to the motor such that the motor imparts rotational motion to the lead screw; and a drive nut engaged with the lead screw such that rotation of the lead screw effects movement of the drive nut along a length of the lead screw, wherein adjustment of the drive nut along the length of the lead screw adjusts a rotational position of the lower leg support.

3. The vehicle seating assembly of claim 2, wherein the one or more guide tracks comprises a first guide track and a second guide track spaced apart from one another along a horizontal direction of the interior surface of the lower leg support, with the first and second guide tracks being parallel to one another.

4. The vehicle seating assembly of claim 3, further comprising:

a synchronizing bracket that is coupled to the drive nut such that actuation of the drive nut along the lead screw effects corresponding actuation of the synchronizing bracket along the lead screw.

5. The vehicle seating assembly of claim 4, wherein the linkage assembly further comprises:

a first linkage arm coupled to a first end of the synchronizing bracket and associated with the first guide track; and a second linkage arm coupled to a second end of the synchronizing bracket and associated with the second guide track.

6. The vehicle seating assembly of claim 5, wherein the first and second linkage arms are coupled to a carrier bracket that is mounted to the underside of the seat.

7. The vehicle seating assembly of claim 6, wherein the carrier bracket pivots about a horizontal axis as the lower leg support is transitioned between the stowed position and the deployed position.

8. The vehicle seating assembly of claim 5, wherein the first and second linkage arms are extendable from a compressed position to an extended position, and wherein the first and second linkage arms are biased to the extended position.

9. The vehicle seating assembly of claim 1, wherein the stowed position of the lower leg support positions the drive nut nearest to the distal end of the lower leg support.

10. The vehicle seating assembly of claim 9, wherein actuation of the drive nut from the distal end of the lower leg support toward the proximate end of the lower leg support transitions the lower leg support from the stowed position toward the deployed position.

11. The vehicle seating assembly of claim 1, further comprising:

an air bladder assembly having a calf portion and a thigh portion, the calf portion being positioned on the exterior surface of the lower leg support and the thigh portion being positioned on the seat proximate to the forward end, the calf portion and the thigh portion being coupled to a common air supply.

12. A vehicle seating assembly, comprising:

a seat having a forward end and a rearward end;

a seatback pivotably coupled to the seat;

a lower leg support having an interior surface and an exterior surface, the lower leg support rotatably coupled to the forward end of the seat, the lower leg support being movable between a stowed position and a deployed position, wherein the stowed position places the lower leg support in an area below the seat, wherein the stowed position of the lower leg support forms an acute angle with the seat, and wherein the lower leg support comprises a proximate end and a distal end, the proximate end of the lower leg support being rotatably coupled to the forward end of the seat; and a linkage assembly coupled to an underside of the seat and the interior surface of the lower leg support, the linkage assembly being responsible for transitioning the lower leg support between the stowed position and the deployed position, the linkage assembly comprising:

a first guide track and a second guide track spaced apart from one another along a horizontal direction of the interior surface of the lower leg support, with the first and second guide tracks being parallel to one another, the first and second guide tracks being directly coupled to the interior surface of the lower leg support;

a motor directly coupled to, and carried by, the interior surface of the lower leg support, wherein the motor is positioned at the proximate end of the lower leg support;

a lead screw that is coupled to the lower leg support and is parallel to the first and second guide tracks, the lead screw having a first end and a second end, the first end of the lead screw being directly coupled to the motor such that the motor imparts rotational motion to the lead screw;

a drive nut engaged with the lead screw such that rotation of the lead screw effects movement of the drive nut along a length of the lead screw, wherein adjustment of the drive nut along the length of the lead screw adjusts a rotational position of the lower leg support;

a synchronizing bracket that is coupled to the drive nut such that actuation of the drive nut along the lead screw effects corresponding actuation of the synchronizing bracket along the lead screw;

a first linkage arm coupled to a first end of the synchronizing bracket and associated with the first guide track; and a second linkage arm coupled to a second end of the synchronizing bracket and associated with the second guide track.

13. The vehicle seating assembly of claim 12, wherein the first and second linkage arms are coupled to a carrier bracket that is mounted to the underside of the seat.

14. The vehicle seating assembly of claim 13, wherein the carrier bracket pivots about a horizontal axis as the lower leg support is transitioned between the stowed position and the deployed position.

15. The vehicle seating assembly of claim 12, wherein the first and second linkage arms are extendable from a compressed position to an extended position, and wherein the first and second linkage arms are biased to the extended position.

16. The vehicle seating assembly of claim 12, wherein the stowed position of the lower leg support positions the drive nut nearest to the distal end of the lower leg support.

17. The vehicle seating assembly of claim 16, wherein actuation of the drive nut from the distal end of the lower leg support toward the proximate end of the lower leg support transitions the lower leg support from the stowed position toward the deployed position.

18. The vehicle seating assembly of claim 12, further comprising:
an air bladder assembly having a calf portion and a thigh portion, the calf portion being positioned on the exterior surface of the lower leg support and the thigh portion being positioned on the seat proximate to the forward end, the calf portion and the thigh portion being coupled to a common air supply.

19. A vehicle seating assembly, comprising:
a seat having a forward end and a rearward end;
a lower leg support having an interior surface and an exterior surface, the lower leg support rotatably coupled to the forward end of the seat, the lower leg support being movable between a stowed position and a deployed position, wherein the lower leg support comprises a proximate end and a distal end, the proximate end of the lower leg support being rotatably coupled to the forward end of the seat; and
a motor directly coupled to, and carried by, the interior surface of the lower leg support, wherein the motor is positioned at the proximate end of the lower leg support.

20. The vehicle seating assembly of claim 19, further comprising:
a linkage assembly coupled to the interior surface of the lower leg support, the linkage assembly being responsible for transitioning the lower leg support between the stowed position and the deployed position.

* * * * *